US010389781B2

(12) United States Patent
Yoo et al.

(10) Patent No.: US 10,389,781 B2
(45) Date of Patent: Aug. 20, 2019

(54) METHOD FOR SHARING MEDIA DATA AMONG ELECTRONIC DEVICES HAVING MEDIA CONTENTS SHARING LISTS AND ELECTRONIC DEVICE THEREOF

(71) Applicant: Samsung Electronics Co., Ltd., Suwon-si, Gyeonggi-do (KR)

(72) Inventors: Dong-Hee Yoo, Incheon (KR); Jong-Cheol Seol, Suwon-si (KR); Hyun-Geun Kim, Suwon-si (KR); Sung-Jae Park, Seoul (KR); Woo-Jin Park, Yongin-si (KR); Min-Suk Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 401 days.

(21) Appl. No.: 14/332,709

(22) Filed: Jul. 16, 2014

(65) Prior Publication Data

US 2015/0067054 A1    Mar. 5, 2015

(30) Foreign Application Priority Data

Aug. 29, 2013 (KR) .......................... 10-2013-0103270

(51) Int. Cl.
*G06F 13/00* (2006.01)
*H04L 29/06* (2006.01)
*H04L 29/08* (2006.01)

(52) U.S. Cl.
CPC .......... *H04L 65/60* (2013.01); *H04L 65/4092* (2013.01); *H04L 67/06* (2013.01);
(Continued)

(58) Field of Classification Search
CPC ..... H04W 8/245; H04W 24/02; H04W 88/02; H04M 1/72525; H04M 1/72522;
(Continued)

(56) References Cited

U.S. PATENT DOCUMENTS 7,516,078 B2 *  4/2009  Dhawan .............. H04M 1/7253
                                                            379/87
2006/0270395 A1 * 11/2006 Dhawan .............. H04M 1/7253
                                                            455/418
(Continued)

FOREIGN PATENT DOCUMENTS

CN      101222493 A      7/2008
CN      102782669 A     11/2012
(Continued)

OTHER PUBLICATIONS

"Chinese Office Action Serial Number Notice 2018022701837240 (for Chinese Application 201400479300)", pp. 1-10; dated Mar. 2, 2018.*

(Continued)

*Primary Examiner* — Robert B Harrell
(74) *Attorney, Agent, or Firm* — Jefferson IP Law, LLP

(57) ABSTRACT

An operation method of an electronic device is provided. The method includes acquiring a media contents sharing list which includes media contents retained by the electronic device and media contents retained by at least one other electronic device communicating with the electronic device, and transmitting the first media contents to the at least one other electronic device based on playback of first media contents retained by the electronic device within the media contents sharing list, and receiving the second media contents from the at least one other electronic device and outputting the received second media contents based on playback of second media contents retained by the at least one other electronic device within the media contents sharing list.

26 Claims, 16 Drawing Sheets

(52) U.S. Cl.
CPC ........ *H04L 67/104* (2013.01); *H04L 67/1044* (2013.01); *H04L 67/1051* (2013.01)

(58) Field of Classification Search
CPC .. H04M 3/487; H04M 3/42017; G06Q 10/10; H04L 29/06; H04L 29/08072; H04L 29/06027; H04L 12/581; H04L 65/60; H04L 65/4092; H04L 67/06; H04L 67/104; H04L 67/1044; H04L 67/1051; H04H 20/82; F16K 21/04; G06F 3/08; G06F 13/00
USPC ............................. 379/87; 455/418; 709/204
See application file for complete search history.

(56) References Cited

U.S. PATENT DOCUMENTS

| | | |
|---|---|---|
| 2008/0140849 A1 | 6/2008 | Collazo |
| 2008/0162668 A1 | 7/2008 | Miller |
| 2009/0298420 A1* | 12/2009 | Haartsen ............... H04J 3/0658 455/3.06 |
| 2011/0218656 A1 | 9/2011 | Bishop et al. |
| 2011/0245944 A1 | 10/2011 | Louboutin |
| 2012/0082424 A1 | 4/2012 | Hubner et al. |
| 2013/0117692 A1 | 5/2013 | Padmanabhan et al. |
| 2014/0122589 A1* | 5/2014 | Fyke ................... H04L 65/1069 709/204 |

FOREIGN PATENT DOCUMENTS

| | | |
|---|---|---|
| CN | 102945276 A | 2/2013 |
| KR | 10-2011-0020694 A | 3/2011 |
| KR | 10-2011-0128487 A | 11/2011 |
| KR | 10-2012-0091785 A | 8/2012 |
| KR | 10-2013-0089389 A | 8/2013 |

OTHER PUBLICATIONS

Engllish Translation of: "Chinese Office Action Serial Number Notice 2018022701837240 (for Chinese Application 201400479300)", pp. 1-16; dated Mar. 2, 2018.*

European Office Action dated May 14, 2019, issued in European Patent Application No. 14839079.2.

* cited by examiner

METHOD FOR SHARING MEDIA DATA AMONG ELECTRONIC DEVICES HAVING MEDIA CONTENTS SHARING LISTS AND ELECTRONIC DEVICE THEREOF

CROSS-REFERENCE TO RELATED APPLICATION(S)

This application claims the benefit under 35 U.S.C. § 119(a) of a Korean patent application filed on Aug. 29, 2013 in the Korean Intellectual Property Office and assigned Serial number 10-2013-0103270, the entire disclosure of which is hereby incorporated by reference.

TECHNICAL FIELD

The present disclosure relates to a method for sharing media data and an electronic device thereof.

BACKGROUND

With a sudden increase of the use of electronic devices, electronic device manufacturers are developing electronic devices providing a diversity of supplementary functions so as to attract more users. For example, applications providing various functions improving users' conveniences and being helpful for lives are being provided.

For instance, with the growth of wireless communication related technologies, a concern about a service of sharing data among electronic devices using a wireless communication technology is suddenly increasing and an application for providing a data sharing function is increasing. For example, the related art provides an application for forming a group composed of a plurality of electronic devices located which share media contents such as music, pictures, documents, games, and the like among the plurality of electronic devices within the group.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for sharing media data over which a plurality of electronic devices each can have an independent playback authority, by sharing a list of media contents included in each of the plurality of electronic devices.

In accordance with an aspect of the present disclosure, a method of an electronic device is provided. The method includes acquiring a media contents sharing list which includes media contents retained by the electronic device and media contents retained by at least one other electronic device communicating with the electronic device, and transmitting the first media contents to the at least one other electronic device based on playback of the first media contents retained by the electronic device within the media contents sharing list, and receiving second media contents from the at least one other electronic device and outputting the received second media contents based on playback of the second media contents retained by the at least one other electronic device within the media contents sharing list.

In accordance with an aspect of the present disclosure, an electronic device is provided. The electronic device includes an output module configured to output media contents, and a processor configured to control the output module. The processor is further configured to acquire a media contents sharing list which includes media contents retained by the electronic device and media contents retained by at least one other electronic device communicating with the electronic device and, at timing of playback of first media contents retained by the electronic device within the media contents sharing list, perform an operation of playing back the first media contents while transmitting the first media contents to the at least one other electronic device and, at timing of playback of second media contents retained by the at least one other electronic device within the media contents sharing list, receive the second media contents from the at least one other electronic device and output the received second media contents.

In accordance with an aspect of the present disclosure, an electronic device is provided. The electronic device includes a display module configured to display a media contents sharing list, an input module configured to detect an input for removing media contents, and a processor configured to control the display module. The display module can display the media contents sharing list that includes media contents retained by the electronic device and media contents retained by at least one other electronic device in accordance to the control of the processor, and exclude the media contents retained by the at least one other electronic device communicating with the electronic device among the media contents included in the media contents sharing list based on the input detecting of the input module, and display the media contents retained by the electronic device. The input module can detect a request for removal of the displayed media contents retained by the electronic device. The processor can remove the removal-requested media contents from the media contents sharing list.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
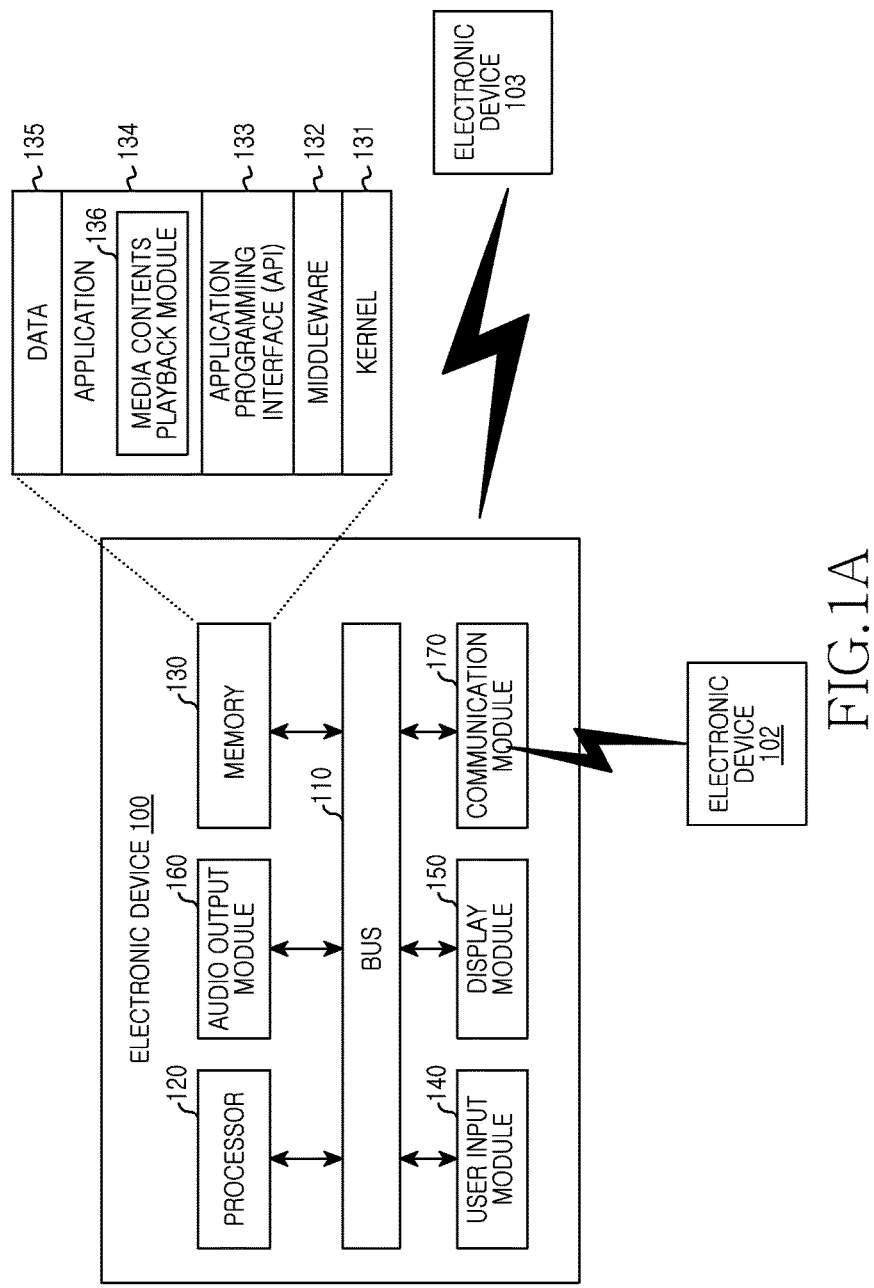
FIG. 1A is a block diagram illustrating a construction of an electronic device for sharing media contents according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Below, a description will be made for a technology for sharing media data among a plurality of electronic devices. In the following description, an electronic device can be a device supporting a telecommunication function and a media contents playback function. For example, the electronic device can, for example, include one or more of a smart phone, a tablet Personal Computer (PC), a mobile phone, a video phone, an electronic book (e-book) reader, a desktop PC, a laptop PC, a netbook computer, a Personal Digital Assistant (PDA), a Portable Multimedia contents Player (PMP), an MPEG Audio Layer 3 (MP3) player, a mobile medical instrument, a camera, a wearable device, an electronic clock, a wrist watch, a refrigerator, an air conditioner, a cleaner, an artificial intelligence robot, a TV, a Digital Video Disk (DVD) player, an audio system, an oven, a microwave, a washing machine, an air cleaner, a medical instrument (for example, Magnetic Resonance Angiography (MRA), Magnetic Resonance Imaging (MRI), Computerized Tomography (CT), a moving-camera, and an ultrasound machine), a navigation device, a Global Positioning System (GPS) receiver, an Event Data Recorder (EDR), a Flight Data Recorder (FDR), a set-top box, a TV box (for example, Samsung HomeSync™, Apple TV™, or Google TV™), an electronic dictionary, a car infotainment device, an electronic equipment for ship (for example, a navigation device for ship and a gyrocompass), avionics, a security instrument, a camcorder, a game console, furniture or part of a building/structure including the electronic device, an electronic board, an electronic signature receiving device, a projector, and the like. In the following description, it is apparent to those skilled in the art that the electronic device is not limited to the aforementioned devices.

FIG. 1A is a block diagram illustrating a construction of an electronic device for sharing media contents according to various embodiments of the present disclosure.

Referring to FIG. 1A, the electronic device 100 can include constituent elements such as a bus 110, a processor 120, a memory 130, a user input module 140, a display module 150, an audio output module 160, and a communication module 170.

The bus 110 can perform a function of connecting the constituent elements included in the electronic device 100 with one another, and forwarding communication among the constituent elements. The processor 120 can control various functions related to an operation of the electronic device 100. For example, the processor 120 can decipher an instruction received from at least one other constituent element included in the electronic device 100 through the bus 110, and execute operation or data processing according to the deciphered instruction, but is not limited thereto.

The processor 120 can control a function of executing one or more programs stored in the memory 130 and providing various services to users. For example, the processor 120 can control a function of executing an application 134 stored in the memory 130, and forming a media contents sharing group with at least one other electronic device 102 or 103 and sharing media contents with the at least one other electronic device 102 or 103 within the formed group.

The memory 130 can store an instruction or data 135 which is received from at least one other constituent element included in the electronic device 100 or is generated by the at least one other constituent element. For example, the memory 130 can store media contents and a media contents sharing list. The media contents sharing list is a list of media contents shared with other electronic devices within a media contents sharing group among media contents that are being retained by the electronic device 100.

Each of the media contents can include identification information (e.g., a Uniform Resource Identifier (URI), a Media Access Control (MAC) address, an International Mobile Equipment Identity (IMEI), a serial number, and a Universally Unique IDentifier (UUID)) of an electronic device storing or retaining the corresponding media content. Additionally, the media contents sharing list can include title, mime type, channel count, sample rate, and sample size information about each media content.

The memory 130 can include programming modules such as a kernel 131, a middleware 132, an Application Programming Interface (API) 133, the application 134, and the like. The programming modules each can be comprised of at least one of software, firmware, and hardware.

The kernel 131 can control or manage a system resource used for executing operations or functions implemented in the other programming modules (for example, the middleware 132, the API 133, and the application 134) included in the memory 130. Also, the kernel 131 provides an interface for enabling the middleware 132, the API 133, or the application 134 to access and control or manage the individual constituent element of the electronic device 100. Here, the system resource can include at least one of the bus 110, the processor 120, and the memory 130.

The middleware 132 can perform a relay role such that the API 133 or the application 134 can communicate and exchange data with the kernel 131. Also, the middleware 132 can perform uniform load balancing for work requests received from one or more applications 134. The middleware 132 can provide a function through the API 133 such that the application 134 can efficiently use the restricted system resource within the electronic device 100. Also, the middleware 132 can include a plurality of modules previously implemented to provide functions commonly required by the application 134. However, it is noted that the roles and functions of the middleware 132 described above are not limited thereto and thus the middleware 132 can perform other roles and functions.

The API 133 can include an interface of enabling the application 134 to control a function of the kernel 131 or the middleware 132. For example, the API 133 can include at least one interface or function for media contents control, file control, window control, image processing, character control or the like.

The application 134 can include one or more of a preload application and a third party application. In accordance to an embodiment of the present disclosure, the application 134 can include a media contents playback module 136. The media contents playback module 136 can include at least one instruction for forming a group in order for the electronic device 100 to share media contents with at least one other electronic device 102 or 103, and sharing the media contents with the at least one other electronic device 102 or 103 within the formed group.

For example, the media contents playback module 136 can include instructions for acquiring a list of media contents intended to be shared by at least one other electronic device included in a media contents sharing group, and collecting the media contents list acquired from the at least one other electronic device and a list of media contents intended to be shared by the electronic device 100 with the other electric devices and creating a media contents sharing list, and transmitting the created media contents sharing list to all the electronic devices within the media contents sharing group.

The media contents playback module 136 can include instructions for, when the electronic device 100 has a media contents playback control authority, playing back its own retaining media contents, and real-time transmitting a media stream for the played media contents to other electronic devices within a group. Also, the media contents playback module 136 can include instructions for, when the electronic device 100 has the media contents playback control authority, confirming media contents to be played back following media contents currently being played back among media contents included within a media contents sharing list, and entrusting the media contents playback control authority to an electronic device retaining the media contents to be played back next time.

The media contents playback control authority can represent an authority capable of performing a function such as media contents playback, playback start, playback stop, playback pause, fast forward, rewind, seek, speaker selection (e.g., left or right speaker), channel selection (e.g., 2.1 channel, 5.1 channel), selection of media contents to be played back, volume adjustment, playback speed adjustment, played media stream transmission, playback method selection (e.g., one-time playback, repetition playback, sequential playback, and random playback), media contents sharing list editing (e.g., media contents addition or removal), media contents sharing list alignment (e.g., alignment in order of name, alignment by singer, alignment by album, and the like), media contents sharing list transmission, and the like.

In accordance to an embodiment of the present disclosure, an electronic device acquiring a media contents playback control authority can play back its own retaining media contents and real-time transmit a media stream for the played media contents to other electronic devices within a group, and can perform a function of media contents playback speed adjustment or volume adjustment of the other electronic devices within the group during the media contents playback.

Additionally, in accordance to an embodiment of the present disclosure, an electronic device acquiring a media contents playback control authority can perform a function of editing and/or realigning a media contents sharing list and retransmitting the edited and/or realigned media contents sharing list to other electronic devices within a group not having the media contents playback control authority, to share the media contents sharing list with the other electronic devices not having the media contents playback control authority.

Also, in accordance to an embodiment of the present disclosure, an electronic device not having a media contents playback control authority can receive a media stream from an electronic device within a group having the media contents playback control authority, and process the received media stream into data which can be outputted to at least one of the display module 150 and the audio output module 160, and output the processed data to the at least one of the display module 150 and the audio output module 160.

An electronic device not having a media contents playback control authority can adjust an audio volume outputted through its own audio output module 160 during media contents playback, but cannot adjust audio volumes outputted from other electronic devices within a group, but is not limited thereto. Additionally, the electronic device not having the media contents playback control authority can send a playback speed adjustment request or a media contents addition or removal request to an electronic device having the media contents playback control authority.

In another embodiment, the media contents playback module 136 can include an instruction of, when the electronic device 100 has a media contents playback control authority, entrusting only a media contents playback and transmission authority, which is a part of the media contents playback control authority, to an electronic device retaining media contents to be played back following media contents currently being played back, without entrusting the whole media contents playback control authority to the electronic device retaining the media contents to be played back next time. The media contents playback and transmission authority can represent an authority capable of performing a function of media contents playback and a function of played media stream transmission.

For example, in accordance to another embodiment of the present disclosure, the media contents playback module 136 can include an instruction for keeping the electronic device 100 having a control authority capable of controlling media contents playback, playback start, playback stop, playback pause, fast forward, rewind, seek, speaker selection, channel selection, selection of media contents to be played back, volume adjustment, playback speed adjustment, playback method selection, media contents sharing list editing, media contents sharing list alignment, media contents sharing list transmission, and the like as it is, and entrusting a function of media contents playback and a function of played media stream transmission, to an electronic device retaining media contents to be played back next time.

The user input module 140 can deliver an instruction or data generated by a user selection or gesture, to the processor 120 or the memory 130 through the bus 110, but is not limited thereto. The user input module 140 can include at least one of a physical key button, a physical keypad, a touch detecting sensor, a proximity sensor, an acceleration sensor, a microphone, a mouse, and the like. The user input module 140 according to an embodiment of the present disclosure can receive an input of an instruction or data for deciding media contents to be shared with other electronic devices within a group, from a user.

Also, the user input module 140 can receive an input of an instruction or data for adding media contents retained by the electronic device 100 or other electronic devices within a group to a media contents sharing list, from a user. Also, the user input module 140 can receive an input of an instruction or data for removing the media contents retained by the electronic device 100 from the media contents sharing list, from the user. Also, the user input module 140 can receive an input of an instruction or data for controlling a playback speed of media contents that are being played back, a volume thereof, and the like, from the user, but is not limited thereto.

The display module 150 can display an image, a picture or data to a user. The display module 150 according to an embodiment of the present disclosure can display a media contents sharing list. The display module 150 can display a graphic element generating a user interface for adding media contents retained by the electronic device 100 or other electronic devices within a group to the media contents sharing list. The display module 150 can display a graphic element generating a user interface for removing the media contents retained by the electronic device 100 from the media contents sharing list.

The communication module 170 can perform wired or wireless communication connection between the electronic device 100 and at least one other electronic device 102 or 103. For example, the communication module 170 can support a short-range communication protocol (e.g., Wireless Fidelity (WiFi), BlueTooth (BT), or Near Field Communication (NFC)) or a network communication (e.g., the Internet, a Local Area Network (LAN), a Wide Area Network (WAN), a telecommunication network, a cellular network, a satellite network, a Plain Old Telephone System (POTS), or the like).

The at least one other electronic device 102 or 103 communicating with the electronic device 100 can be a device of the same type as the electronic device 100 or can be a device of a different type. In accordance to an embodiment of the present disclosure, the communication module 170 can communicate with the at least one other electronic device 102 located within a threshold distance from the electronic device 100 and form a group. For example, the communication module 170 can perform a mobile Access Point (AP) function for group creation, or can perform communication connection with an electronic device operating as a mobile AP of a created group and join the created group.

Referring to FIG. 1A, the description has been made in which the electronic device 100 performs a media contents sharing function, based on a method in which the processor 120 of the electronic device 100 executes the media contents playback module 136 included in the memory 130. But, in another embodiment, the processor 120 of the electronic device 100 can also directly perform a control function for media contents sharing as illustrated in FIG. 1B below.

Figure 1B:
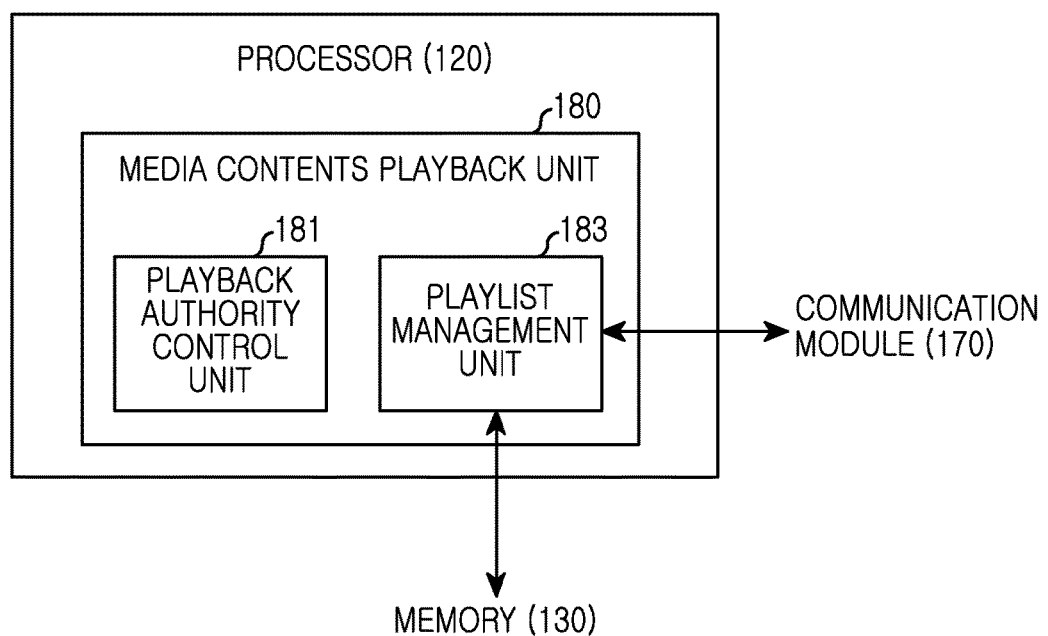
FIG. 1B is a block diagram illustrating a construction of a processor for sharing media contents in an electronic device according to various embodiments of the present disclosure.

FIG. 1B is a block diagram illustrating a construction of a processor for sharing media contents in an electronic device according to various embodiment of the present disclosure.

Referring to FIG. 1B, the processor 120 can include a media contents playback unit 180. The media contents playback unit 180 can perform a function for forming a group in order for the electronic device 100 to share media contents with at least one other electronic device 102 or 103, and sharing the media contents with the at least one other electronic devices 102 or 103 within the formed group. The media contents playback unit 180 can include a playlist management unit 183 and a playback authority control unit 181, but is not limited thereto.

The playlist management unit 183 can control a function for acquiring a list of media contents intended to be shared by at least one other electronic device included in a media contents sharing group, and collecting the media contents list acquired from the at least one other electronic device 102 or 103 and a list of media contents intended to be shared by the electronic device 100 with the at least one other electric device 102 or 103 and creating a media contents sharing list, and transmitting the created media contents sharing list to all the electronic devices 102 and 103 within the media contents sharing group.

The playback authority control unit 181 can control a function for, when the electronic device 100 has a media contents playback control authority, playing back its own retaining media contents, and real-time transmitting a media stream for the played media contents to other electronic devices within a group. Additionally, in accordance to an embodiment of the present disclosure, the playback authority control unit 181 can perform a function for, when the electronic device 100 has the media contents playback control authority, confirming media contents to be played back following media contents currently being played back among media contents included within a media contents sharing list, and entrusting the media contents playback control authority to an electronic device retaining the media contents to be played back next time.

In another embodiment, the playback authority control unit 181 can perform a function for, when the electronic device 100 has a media contents playback control authority, entrusting only a media contents playback and transmission authority to an electronic device retaining media contents to be played back following media contents currently being played back, without entrusting the media contents playback control authority to the electronic device retaining the media contents to be played back next time.

For description convenience below, an electronic device having a media contents playback control authority is called a master device, and an electronic device not having the media contents playback control authority is called a slave device. In other words, the master device can perform a function of media contents playback and a function of media stream transmission so as to share its own retaining media contents with other electronic devices within a group, and the master device can perform functions of playback start of self and other electronic devices within a group, playback stop, playback pause, fast forward, rewind, seek, speaker selection, channel selection, selection of media contents to be played back, volume adjustment, playback speed adjustment, playback method selection, media contents sharing list editing, media contents sharing list alignment, media contents sharing list transmission, and the like. However, it is noted that the master device and the slave device can perform functions other than those described above.

Also, the slave device can receive a media stream from the master device, and output the received media stream through a display device or an audio output device. The slave device can adjust (e.g., volume adjustment, playback speed adjustment, and the like) data outputted through its own display device or audio output device during media contents playback, but cannot adjust outputted data of other electronic devices within a group, for instance, the master device and other slave devices. Additionally, the slave device can send a playback speed adjustment request or a media contents addition or removal request to the master device.

Figure 2A:
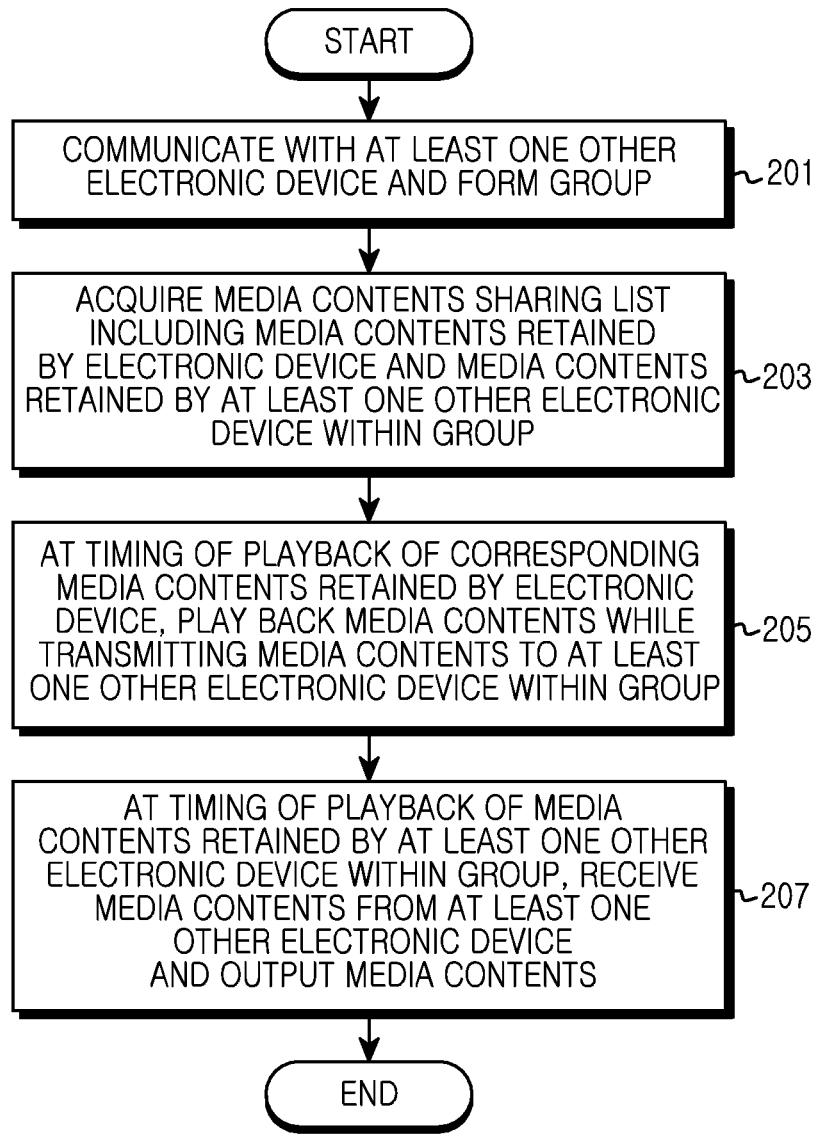
FIG. 2A is a flowchart illustrating an operation procedure for sharing media contents in an electronic device according to various embodiments of the present disclosure.

FIG. 2A is a flowchart illustrating an operation procedure for sharing media contents in an electronic device according to various embodiment of the present disclosure.

Referring to FIG. 2A, in operation 201, the electronic device 100 can communicate with at least one other electronic device and form a group. For example, the electronic device 100 can detect the execution of an application for sharing media contents, and perform wireless connection with at least one other electronic device located within a threshold distance from the electronic device 100 and form a media contents sharing group.

In operation 203, the electronic device 100 can acquire a media contents sharing list that includes media contents retained by the electronic device 100 and media contents retained by the at least one other electronic device within the group. For example, the electronic device 100 can select sharing media contents by user control, and create the media contents sharing list, which includes all of the selected sharing media contents of the electronic device 100 and sharing media contents information received from the at least one other electronic device within the group. For another example, the electronic device 100 can select the sharing media contents by the user control, and transmit information about the selected sharing media contents to a master device within the group, and receive the media contents sharing list from the master device.

In operation 205, at timing of playback of the media contents retained by the electronic device 100, the electronic device 100 can play back the corresponding media contents while transmitting the corresponding media contents to the at least one other electronic device within the group. For example, when it is playback time of the media contents retained by the electronic device 100 among a plurality of media contents included within the media contents sharing list, the electronic device 100 can acquire a media contents playback authority and play back the corresponding media contents stored in the memory 130 and, concurrently with this, transmits a media stream for the corresponding media contents to the other electronic devices within the group.

If first starting a media contents sharing function within the group, the electronic device 100 can previously acquire a media contents playback authority at a start time of media contents sharing. On the other hand, if starting the media contents sharing function later than the other electronic devices within the group, the electronic device 100 can acquire the media contents playback authority from the other electronic devices within the group at playback time of the media contents retained by the electronic device 100.

In operation 207, at playback time of the media contents retained by the other electronic devices within the group, the electronic device 100 can real-time receive the media contents from the other electronic devices and output the received media contents. In accordance with an embodiment, when media contents to be played back next time are the media contents of the other electronic devices, the electronic device 100 can entrust the media contents playback authority to the other electronic devices such that the other electronic devices can play back the next media contents. Also, the electronic device can terminate the media contents sharing procedure according to the embodiment of the present disclosure.

Figure 2B:
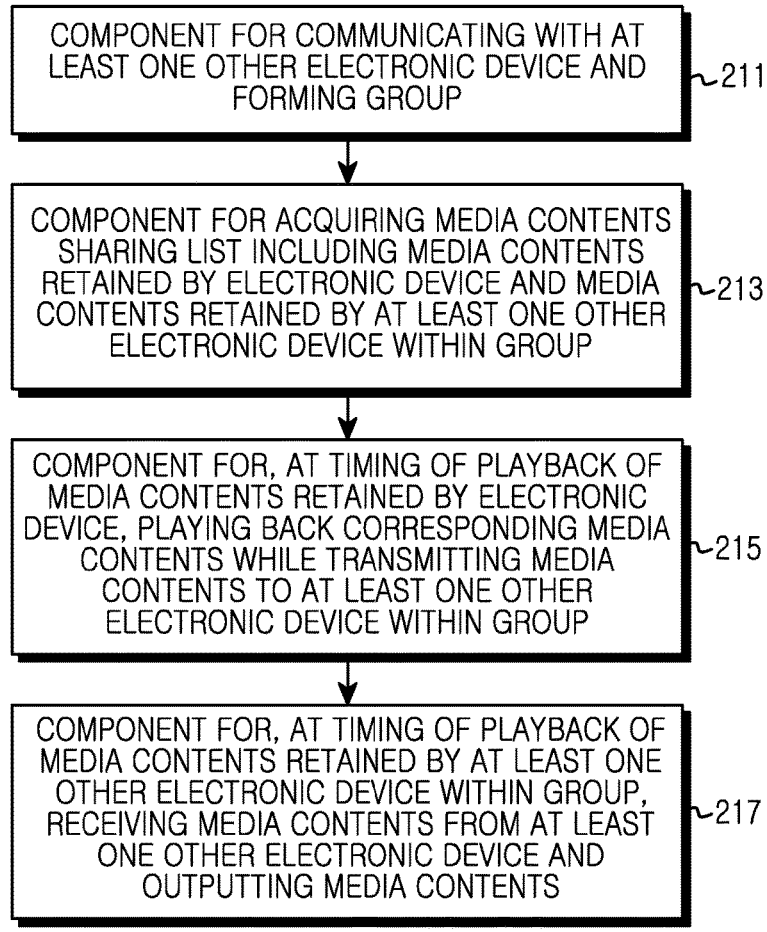
FIG. 2B is a diagram illustrating sharing media contents in an electronic device according to various embodiments of the present disclosure.

FIG. 2B is a diagram illustrating sharing media contents in an electronic device according to various embodiment of the present disclosure.

Referring to FIG. 2B, the electronic device 100 can include a component 211 configured to communicate with at least one other electronic device and forming a group. For example, the electronic device 100 can include a component configured to detect a selection of a media contents sharing application, and a configured to detect at least one other electronic device located within a threshold distance from the electronic device 100 and performing wireless connection with the detected at least one other electronic device.

The electronic device 100 can include another component 213 configured to acquire a media contents sharing list that includes media contents retained by the electronic device 100 and media contents retained by the at least one other electronic device within the group. For example, the electronic device 100 can include a component configured to detect sharing media contents selected by user control, and a component configured to receive information about the sharing media contents from the at least one other electronic device within the group, and a component configured to create the media contents sharing list that includes the selected sharing media contents and the sharing media contents whose information has been received.

For another example, the electronic device 100 can include a component configured to detect the sharing media contents selected by the user control, a component configured to transmit information about the selected sharing media contents to a master device within a group, and a component configured to receive the media contents sharing list from the master device.

The electronic device 100 can include a component 215 configured to, at timing of playback of media contents retained by the electronic device 100, play back the corresponding media contents while transmitting the corresponding media contents to the at least one other electronic device within the group. For example, the electronic device 100 can include a component configured to, when it becomes timing of playback of media contents retained by the electronic device 100 among a plurality of media contents included within the media contents sharing list, acquire a media contents playback authority, and a component configured to play back the corresponding media contents stored in the memory 130, and a component configured to, concurrently with the media contents playback, transmit a media stream for the corresponding media contents to the other electronic devices within the group.

The electronic device 100 can include a component 217 configured to, at timing of playback of media contents retained by the other electronic devices within the group, real-time receive the media contents from the other electronic devices and output the received media contents. For example, the electronic device 100 can include a component configured to real-time receive the media contents from the other electronic devices within the group, and a component configured to output the received media contents and provide the media contents to users.

Figure 3A:
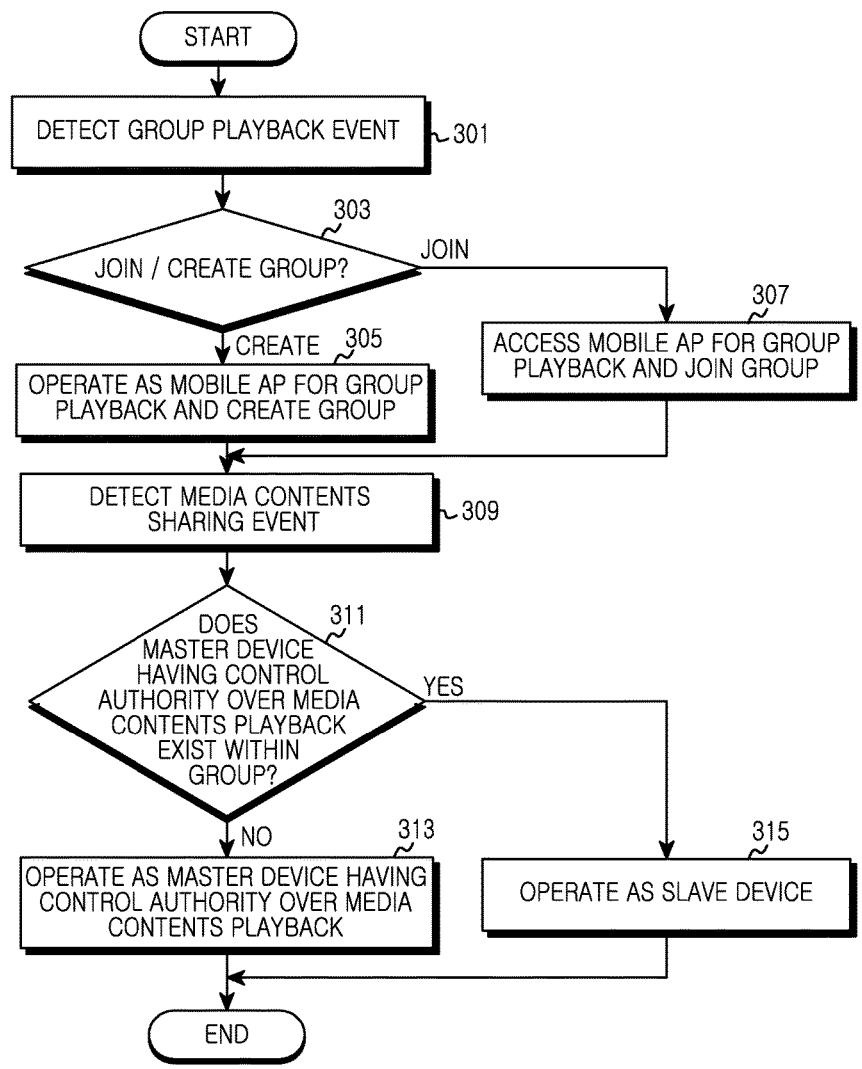
FIG. 3A is a flowchart illustrating a procedure of group forming for media contents sharing in an electronic device according to various embodiments of the present disclosure.

FIG. 3A is a flowchart illustrating a procedure of group forming for media contents sharing in an electronic device according to various embodiment of the present disclosure.

Referring to FIG. 3A, in operation 301, the electronic device 100 can sense the occurrence of a group playback event. For example, the electronic device 100 can detect the occurrence of the group playback event by detecting the execution of an application for sharing media contents such as music, picture, document, game and the like with at least one other electronic device located within a threshold distance from the electronic device 100.

In operation 303, the electronic device 100 can decide if a group creation event occurs by user control or if a group joining event occurs. If the group creation event occurs, in operation 305, the electronic device 100 can operate as a mobile AP for group creation and create a new group for a media contents sharing service. The electronic device 100 operating as the mobile AP of the group for the media contents sharing service can be called a group owner for a media contents sharing service group. On the other hand, if the group joining event occurs, in operation 307, the electronic device 100 searches an electronic device located within a threshold distance from the electronic device 100 and operating as a mobile AP for the media contents sharing service, and accesses the searched electronic device, and joins a group created by the searched electronic device.

Here, if the electronic device located within the threshold distance from the electronic device 100 and operating as the mobile AP for providing the media contents sharing service exists in plural, the electronic device 100 can provide a user with a plurality of mobile AP information for the media contents sharing service, and receive a selection of one mobile AP from the user, and access the selected mobile AP, but is not limited thereto.

Operation 303, operation 305, and operation 307 are operations in which the electronic device 100 forms a group for a media contents sharing service with at least one other electronic device. The description has been made for a method in which one electronic device operates as a mobile AP for forming a service group and at least one other electronic device accesses the mobile AP. But, in accordance to another embodiment, electronic devices can form the group for the media contents sharing service without the mobile AP. For example, in a Peer to Peer (P2P) network or Ad-hoc network, an electronic device detecting a group playback event for media contents sharing can form a group for media contents sharing with a peripheral electronic device, by transmitting/receiving a signal for group forming with the peripheral electronic device.

The operation of forming the group for the media contents sharing service described in operation 303 to operation 307 can be an operation separate from an operation of forming a telecommunication network among electronic devices. For instance, an electronic device can form a service group with at least one other electronic device for the sake of media contents sharing in a state being connected to the telecommunication network. In operation 309, the electronic device 100 creating the group or joining the group detects the occurrence of a media contents sharing event. For example, the electronic device 100 can display a media contents type list (e.g., a list including at least one of music sharing, picture sharing, document sharing, and game sharing) capable of being shared with other electronic devices within a group, and detect a selection of a specific media contents type item by user control to detect the occurrence of the media contents sharing event.

In operation 311, the electronic device 100 can determine if a master device having a control authority over media contents playback exists within the group. For example, the electronic device 100 can determine the existence or non-existence of other electronic devices within the group which first attempts to share media contents of the same type as the type of media contents intended to be shared by the electronic device 100. For instance, if the electronic device 100 operates as the mobile AP, the electronic device 100 can determine the existence or non-existence of other electronic device first attempting to share the media contents of the same type within the group, on the basis of whether a signal of notifying sharing of media contents of a specific type is received from other electronic device accessing the electronic device 100.

Also, when the electronic device 100 does not operate as the mobile AP, the electronic device 100 can determine the existence or non-existence of other electronic device first attempting to share the media contents of the same type within the group, on the basis of whether a signal of notifying that other electronic device desires to share media contents of a specific type is previously received from an electronic device operating as the mobile AP. In other words, regardless of whether the electronic device 100 operates as the mobile AP, the electronic device 100 can transmit a signal for confirming whether a master device exists within the group. Upon receiving a confirmation response message to this, the electronic device 100 can determine that the master device exists within the group. If the confirmation response message is not received, the electronic device 100 can determine that the master device does not exist.

If it is determined that the master device having the control authority over the media contents playback does not exist within the group as the determination result of operation 311, in operation 313, the electronic device 100 can operate as the master device having the control authority over the media contents playback. If it is determined that the master device having the control authority over the media contents playback exists within the group as the determination result of operation 311, in operation 315, the electronic device 100 can operate as a slave device not having the control authority over the media contents playback. The electronic device 100 can terminate the procedure of the group forming for the media contents sharing according to the embodiment of the present disclosure.

Referring to FIG. 3A above, the electronic device 100 detects the occurrence of the media contents sharing event based on a selection of a specific media contents type item, but can also detect the occurrence of the media contents sharing event based on a user input of other methods in accordance to another embodiment. For example, the electronic device 100 can display a retained media contents list which includes media contents of a different type retained by the electronic device 100, and detect a selection of at least one media content by user control among the retained media contents list and detect the occurrence of the media contents sharing event.

Figure 3B:
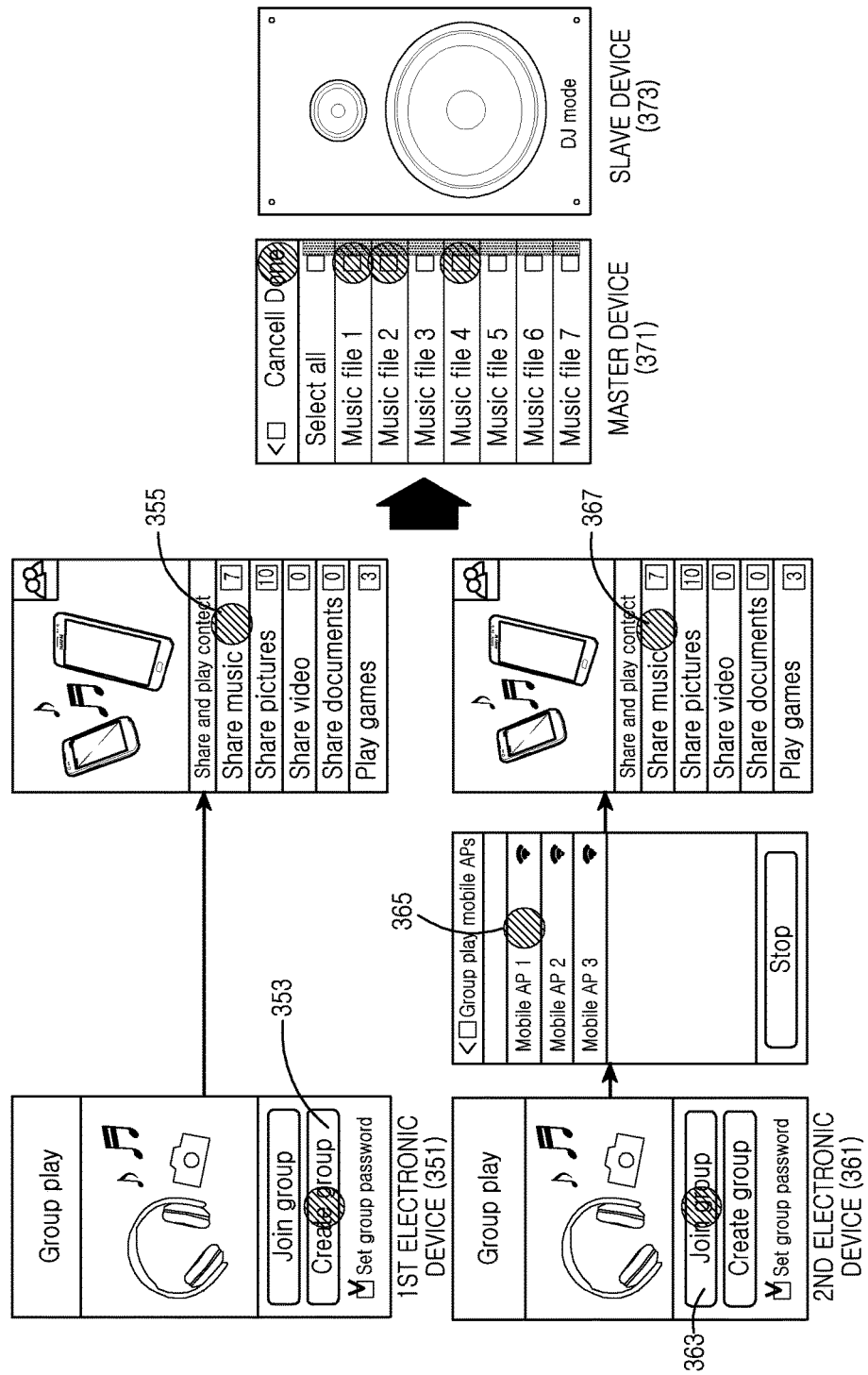
FIG. 3B is a diagram illustrating an example in which a plurality of electronic devices form a group and share media contents with one another in accordance to various embodiments of the present disclosure.

FIG. 3B is a diagram illustrating an example in which a plurality of electronic devices form a group and share media contents with one another in accordance with various embodiments of the present disclosure.

Referring to FIG. 3B, if the execution of a media contents sharing application is detected by user control, a $1^{st}$ electronic device 351 and a $2^{nd}$ electronic device 361 can provide user interfaces for enabling users to select "create group" or "join group" for media contents sharing.

For description convenience below, a description is made assuming that the $1^{st}$ electronic device 351 receives a selection of "create group" 353 from a user, and the $2^{nd}$ electronic device 361 receives a selection of "join group" 363 from the user. The $1^{st}$ electronic device 351 can operate as a mobile AP for group creation, and provide a user interface for enabling the user to select the type (e.g., music, picture, document, and game) of media contents to be shared with other electronic devices within a group.

The $2^{nd}$ electronic device 361 can search mobile APs located within a threshold distance for the purpose of group joining, and provide a user interface for enabling the user to select one of the searched mobile APs. The $2^{nd}$ electronic device 361 can receive a selection in operation 365 of a mobile AP corresponding to the 1st electronic device 351 from the user, and perform wireless connection to the selected mobile AP. Also, the $2^{nd}$ electronic device 361 can provide the user interface for enabling the user to select the type (e.g., music, picture, document, and game) of media contents to be shared with other electronic devices within a group formed by the connected mobile AP.

The $1^{st}$ electronic device 351 and the $2^{nd}$ electronic device 361 can detect selection in operations 355 and 367 of music sharing items by a user. At this time, if timing of detecting the music sharing item selection 355 in the $1^{st}$ electronic device 351 is earlier than timing of detecting the music sharing item selection 367 in the $2^{nd}$ electronic device 361, the $1^{st}$ electronic device 351 can operate as a master device, and the $2^{nd}$ electronic device 361 can operate a slave device.

On contrary, if the timing of detecting the music sharing item selection 367 in the $2^{nd}$ electronic device 361 is earlier than the timing of detecting the music sharing item selection 355 in the $1^{st}$ electronic device 351, the $2^{nd}$ electronic device 361 can operate as the master device, and the $1^{st}$ electronic device 351 can operate the slave device. In accordance to an embodiment, the electronic device operating as the master device 371 can display a music sharing list or a user interface for controlling music playback, and the electronic device operating as the slave device 373 can display a graphic representing that it is outputting an audio stream received from the master device 371.

As in FIG. 3A and FIG. 3B described above, the electronic device 100 terminating the procedure of group forming for media contents sharing according to the embodiment of the present disclosure can perform functions described in FIG. 4A, FIG. 4B, FIG. 5A, FIG. 5B, FIG. 6A, and FIG. 6B below in accordance to an event which occurs by a user control or a signal transmitted/received with other electronic device within a group.

Figure 4A:
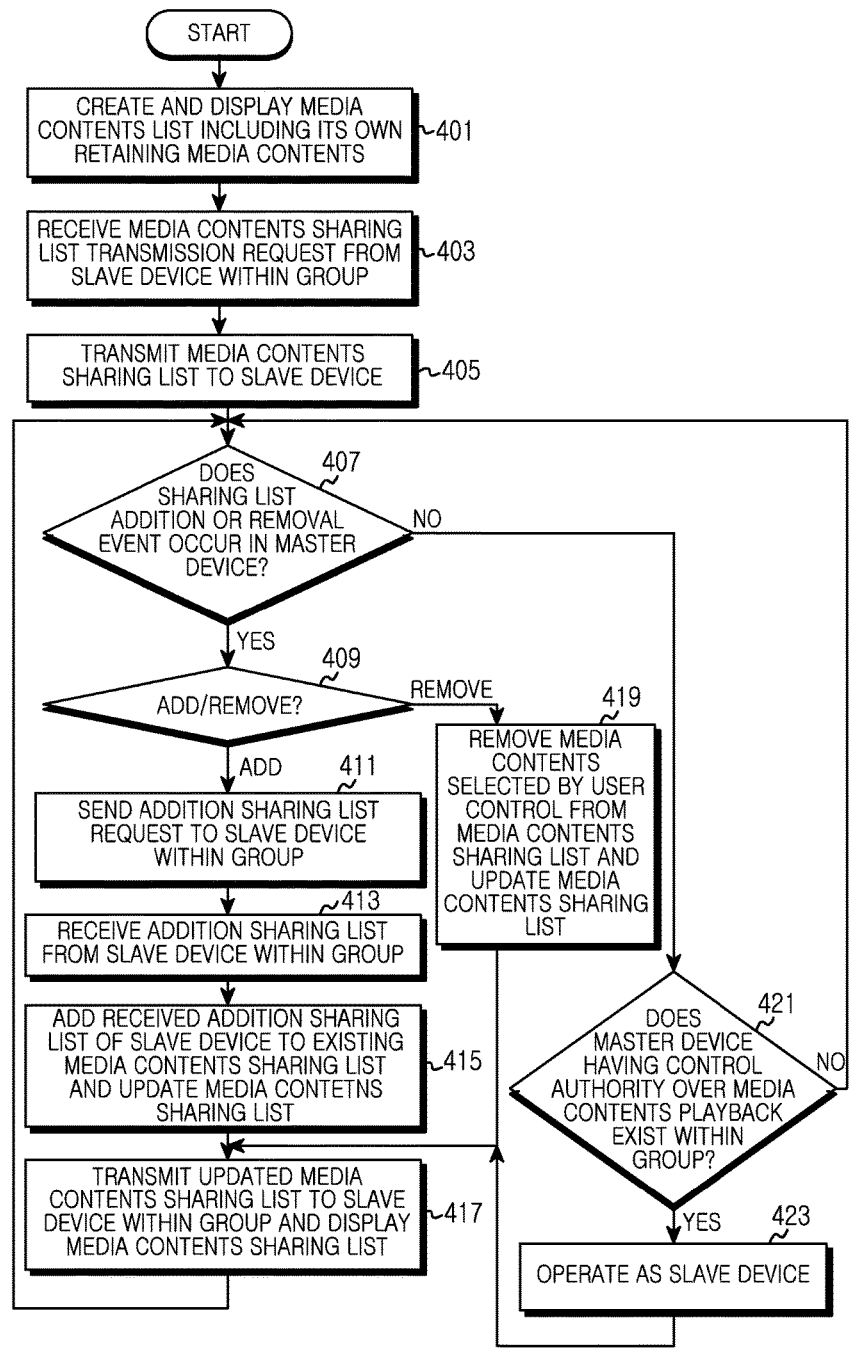
FIG. 4A is a flowchart illustrating a procedure of managing a media contents sharing list in a master device within a media contents sharing group according to various embodiments of the present disclosure.

FIG. 4A is a flowchart illustrating a procedure of managing a media contents sharing list in a master device within a media contents sharing group according to various embodiment of the present disclosure.

Referring to FIG. 4A, in operation 401, the master device creates a media contents sharing list including its own retaining media contents, and displays the created media contents sharing list. The master device can display media contents of a type intended to be shared among a plurality of media contents stored in the memory 130, and decide at least one sharing media content by user selection, and create the media contents sharing list including information about the decided at least one sharing media content. The master device can also create the media contents sharing list using information about at least one sharing media content which is previously decided by user selection and stored.

In operation 403, the master device receives a media contents sharing list transmission request from a slave device within a group. For example, the master device can receive a signal requesting to transmit a media contents sharing list, from other electronic device joining a media contents sharing group. In operation 405, the master device receiving the media contents sharing list transmission request transmits a media contents sharing list to the detected slave device. Here, the master device receives the media contents sharing list transmission request from the slave device, and transmits the media contents sharing list to the slave device in response to the request, in accordance to a design method, if the master device detects a slave device joining a group, the master device can also automatically transmit the media contents sharing list to the slave device without the media contents sharing list transmission request of the slave device.

In operation 407, the master device determines if a sharing list addition or removal event occurs through a user interface of the master device. If the sharing list addition or removal event occurs through the user interface of the master device, in operation 409, the master device determines if the occurring event is an addition event or a removal event.

If it is determined that the addition event occurs as the determination result of operation 409, in operation 411, the master device sends an addition sharing list request to slave devices within the group. In operation 413, the master device receives an addition sharing list from at least one slave device within the group. The received addition sharing list can include information about sharing media contents selected by a user in each slave device and identification information of the slave device retaining the corresponding media contents.

In operation 415, the master device adds at least one addition sharing list received from at least one slave device, to an existing media contents sharing list, to update the media contents sharing list. Here, although information of media contents of the same metadata are received from two different slave devices, the master device can recognize that the two media contents are different media contents based on identification information of electronic devices retaining the media contents, and add the two media contents to the media contents sharing list. This is because, although it is the media contents of the same metadata, the content thereof may be not perfectly consistent with one other due to user's contents editing and the like.

In operation 417, the master device transmits the updated media contents sharing list to the slave device within the group, and displays the updated media contents sharing list. The master device returns to operation 407 and performs the subsequent operations. If it is determined that the removal event occurs as the determination result of operation 409, in operation 419, the master device removes media contents selected by user control from the media contents sharing list to update the media contents sharing list. The master device can provide a user interface capable of selectively removing media contents retained by the master device among the media contents included in the media contents sharing list, and can detect a user selection and decide media contents to be removed.

In operation 417, the master device can transmit the updated media contents sharing list to the slave device within the group, and display the updated media contents sharing list. Also, the master device can return to operation 407 and perform the subsequent operations.

In any embodiment, if the sharing list addition or removal event does not occur through the user interface of the master device in operation 407, in operation 421, the master device determines if sharing list addition or removal is requested from the slave device within the group. For example, the master device can determine if an addition sharing list is received or if a removal sharing list is received from the slave device within the group.

If the sharing list addition or removal is requested from the slave device within the group, in operation 423, the master device updates the media contents sharing list using the addition-requested or removal-requested sharing list. For example, if the sharing list addition is requested from the slave device within the group, the master device can add the addition-requested sharing list to a current media contents sharing list to update the media contents sharing list.

For another example, if the sharing list removal is requested from the slave device within the group, the master device can remove the removal-requested sharing list from the current media contents sharing list to update the media contents sharing list. In operation 417, the master device transmits the updated media contents sharing list to the slave device within the group, and displays the updated media contents sharing list. Also, the master device can return to operation 407 and perform the subsequent operations. In FIG. 4A described above, when the electronic device 100 is entrusted with a media contents playback authority from other electronic device within the group and operates as the master device, operation 401 to operation 403 can be omitted because it is a state in which the media contents sharing list within the group has been previously created.

Figure 4B:
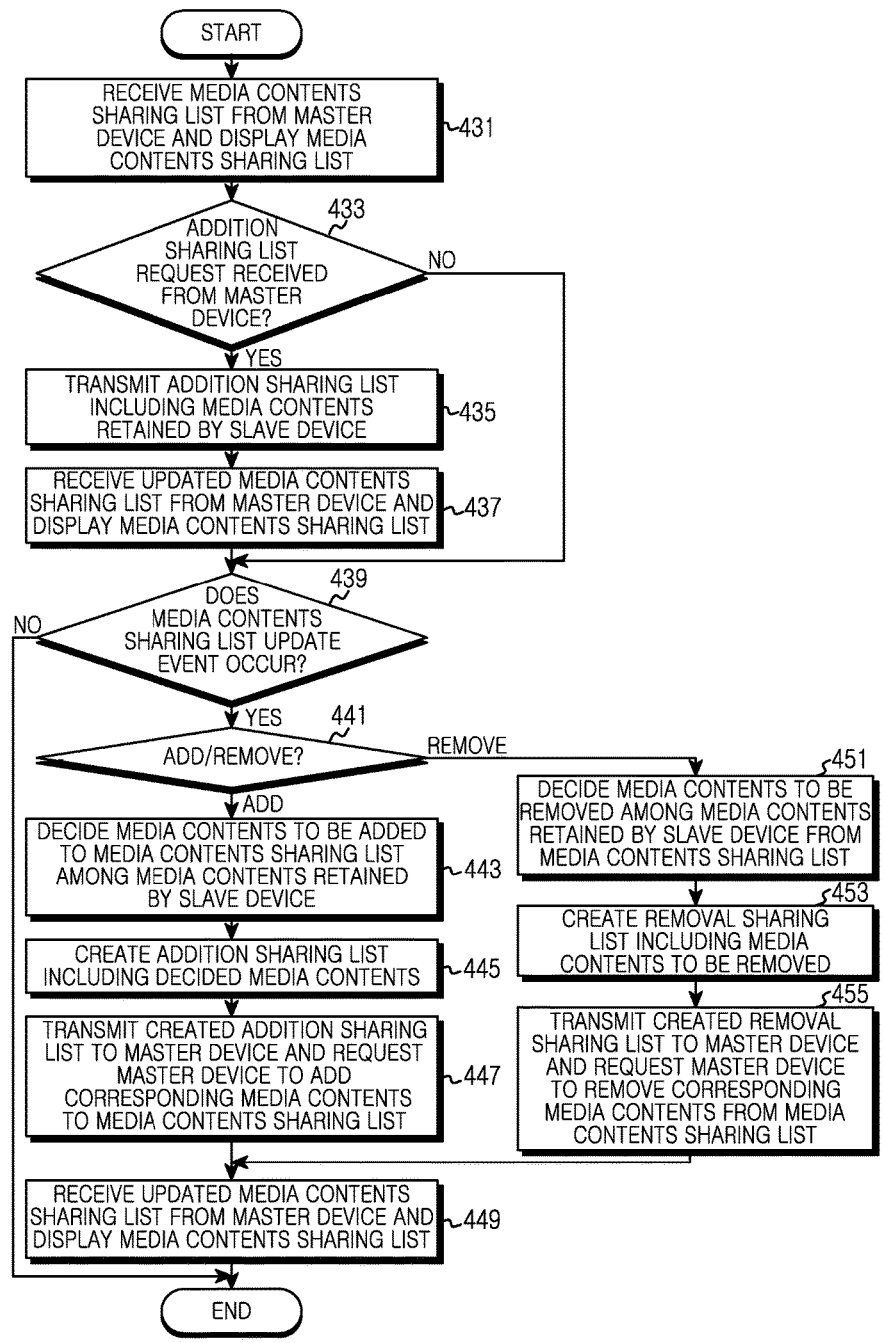
FIG. 4B is a flowchart illustrating a procedure of managing a media contents sharing list in a slave device within a media contents sharing group according to various embodiments of the present disclosure.

FIG. 4B is a flowchart illustrating a procedure of managing a media contents sharing list in a slave device within a media contents sharing group according to various embodiments of the present disclosure.

Referring to FIG. 4B, in operation 431, the slave device receives a media contents sharing list from a master device and displays the received media contents sharing list. The slave device can send a media contents sharing list transmission request to the master device and then receive the media contents sharing list from the master device in response to this, or can automatically receive the media contents sharing list from the master device without sending the media contents sharing list transmission request to the master device.

In operation 433, the slave device determines if an addition sharing list is requested from the master device. If the addition sharing list is requested from the master device, in operation 435, the slave device transmits the addition sharing list including information about its own retaining media contents to the master device. For example, the slave device can transmit the addition sharing list including information about media contents selected by a user among its own retaining media contents, to the master device.

For another example, the slave device can transmit a previously created and stored addition sharing list to the master device. In operation 437, the slave device can receive the updated media contents sharing list from the master device and display the received media contents sharing list. The updated media contents sharing list can include the addition sharing list transmitted by the slave device and, additionally, can include an addition sharing list of at least one other electronic device within a group.

In operation 439, the slave device determines if a sharing list addition or removal event occurs through a user interface of the slave device. If the sharing list addition or removal event does not occur through the user interface of the slave device, the slave device terminates the procedure of managing the media contents sharing list according to the embodiment of the present disclosure. On the other hand, if the sharing list addition or removal event occurs through the user interface of the slave device, in operation 441, the slave device determines if the occurring event is an addition event or a removal event.

If it is determined that the addition event occurs as the determination result of operation 441, in operation 443, the slave device decides media contents to be added to the media contents sharing list among its own retaining media contents. For example, the slave device provides a user interface for selecting media contents to be shared among its own retaining media contents, and enabling a user to select the media contents to be shared. For another example, the slave device can determine media contents previously set to be added to the media contents sharing list.

In operation 445, the slave device creates an addition sharing list including information of the media contents decided to be added. In operation 447, the slave device transmits the created addition sharing list to the master device and requests the master device to add the addition sharing list to the media contents sharing list. In operation 449, the slave device receives the updated media contents sharing list from the master device and displays the received media contents sharing list. The slave device terminates the procedure of managing the media contents sharing list according to the embodiment of the present disclosure.

If it is determined that the removal event occurs as the determination result of operation 441, in operation 451, the slave device decides media contents to be removed among its own retaining media contents among the media contents included in the media contents sharing list. For example, the slave device provides a user interface for selecting its own retaining media contents among the media contents included in the media contents sharing list, and enabling the user to select the media contents to be removed. At this time, the slave device can control to disable the user to select media contents not retained by itself among the media contents included in the media contents sharing list.

In operation 453, the slave device creates a removal sharing list including information of the media contents decided to be removed. In operation 455, the slave device transmits the created removal sharing list to the master device and requests the master device to remove corresponding media contents from the media contents sharing list. In operation 449, the slave device receives the updated media contents sharing list from the master device and displays the received media contents sharing list. The slave device terminates the procedure of managing the media contents sharing list according to the embodiment of the present disclosure.

In FIG. 4B described above, the description has been made for a construction in which, when the media contents sharing list is received from the master device, the slave device displays the received media contents sharing list but, in accordance to a design method, when there is a user's request, the slave device may display the media contents sharing list. For example, if the slave device receives the media contents sharing list and a media stream from the master device, the slave device can basically output the media stream to the display module 150 and the audio output module 160, and can display the received media contents sharing list when a media contents sharing list display request is received from a user.

Referring to FIGS. 4A and 4B described above, the media contents sharing list, the addition sharing list, and the removal sharing list transmitted/received among electronic devices can include identification information (e.g., a URI, a MAC address, IMEI, serial number, a UUID) of an electronic device retaining media contents and information such as a title of the media contents, a mime type thereof, a channel count thereof, a sample rate thereof, and a sample size thereof, and the like, by media contents.

In the embodiments of FIGS. 4A and 4B described above, the description has been made for a method in which the master device sends an addition sharing list request to the slave device in order to add an addition sharing list of the slave device to the media contents sharing list. But, in accordance to an embodiment, the master device can also add the addition sharing list of the slave device to the media contents sharing list, without sending the addition sharing list request to the slave device. For example, in a case where the electronic device 100 first forms a media contents sharing group with a specific electronic device, after the electronic device 100 stores an addition sharing list acquired from the specific electronic device in the memory 130, when a media contents sharing group is again formed with the specific electronic device in the future, the electronic device 100 can use the addition sharing list of the specific electronic device stored in the memory 130, without sending an addition sharing list request to the specific electronic device.

This makes possible the omission of a cumbersome process of creating a new media contents sharing list, in a case where electronic devices forming a group for media contents sharing are the same as one another. In a case where the electronic device 100 uses an addition sharing list previously stored in the memory 130 for each electronic device, before updating the media contents sharing list using the addition sharing list, the electronic device 100 can determine the effectiveness of the addition sharing list through a communication with the corresponding electronic device. For example, the electronic device can determine if the corresponding electronic device is still retaining media contents included in its own storing addition sharing list.

The electronic device 100 can decide that media contents are not effective if it is determined that information of the media contents is included in an addition sharing list stored in an electronic device but the media contents are no longer retained by the corresponding electronic device. On the other hand, the electronic device 100 can decide that the media contents are effective if it is determined that the information of the media contents is included in the addition sharing list stored in the electronic device and also the media contents are still retained by the corresponding electronic device. The electronic device 100 can create and store an addition sharing list including only media contents effective for a corresponding electronic device, and update the media contents sharing list using this addition sharing list.

Figure 4C:
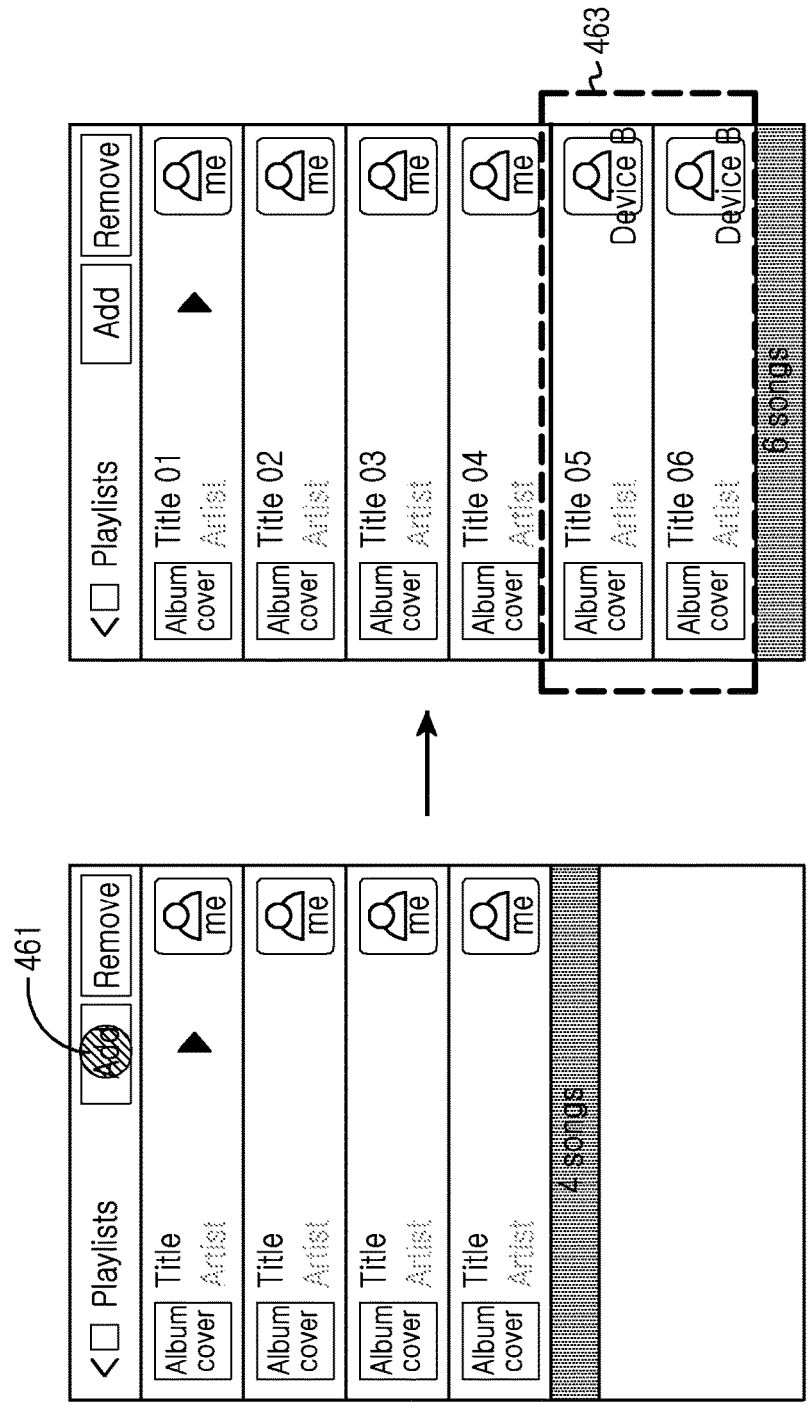
FIG. 4C is a diagram illustrating an example of adding media contents of other electronic device to a media contents sharing list in an electronic device within a media contents sharing group according to various embodiments of the present disclosure.

FIG. 4C is a diagram illustrating an example of adding media contents of other electronic device to a media contents sharing list in an electronic device within a media contents sharing group according to various embodiments of the present disclosure.

Referring to FIG. 4C, if an "Add" menu for adding sharing media contents is selected in operation 461 by a user in a state of displaying a media contents sharing list, the electronic device 100 can receive an addition sharing list 463 from a device B being other electronic device within a group and update the media contents sharing list.

Figure 4D:
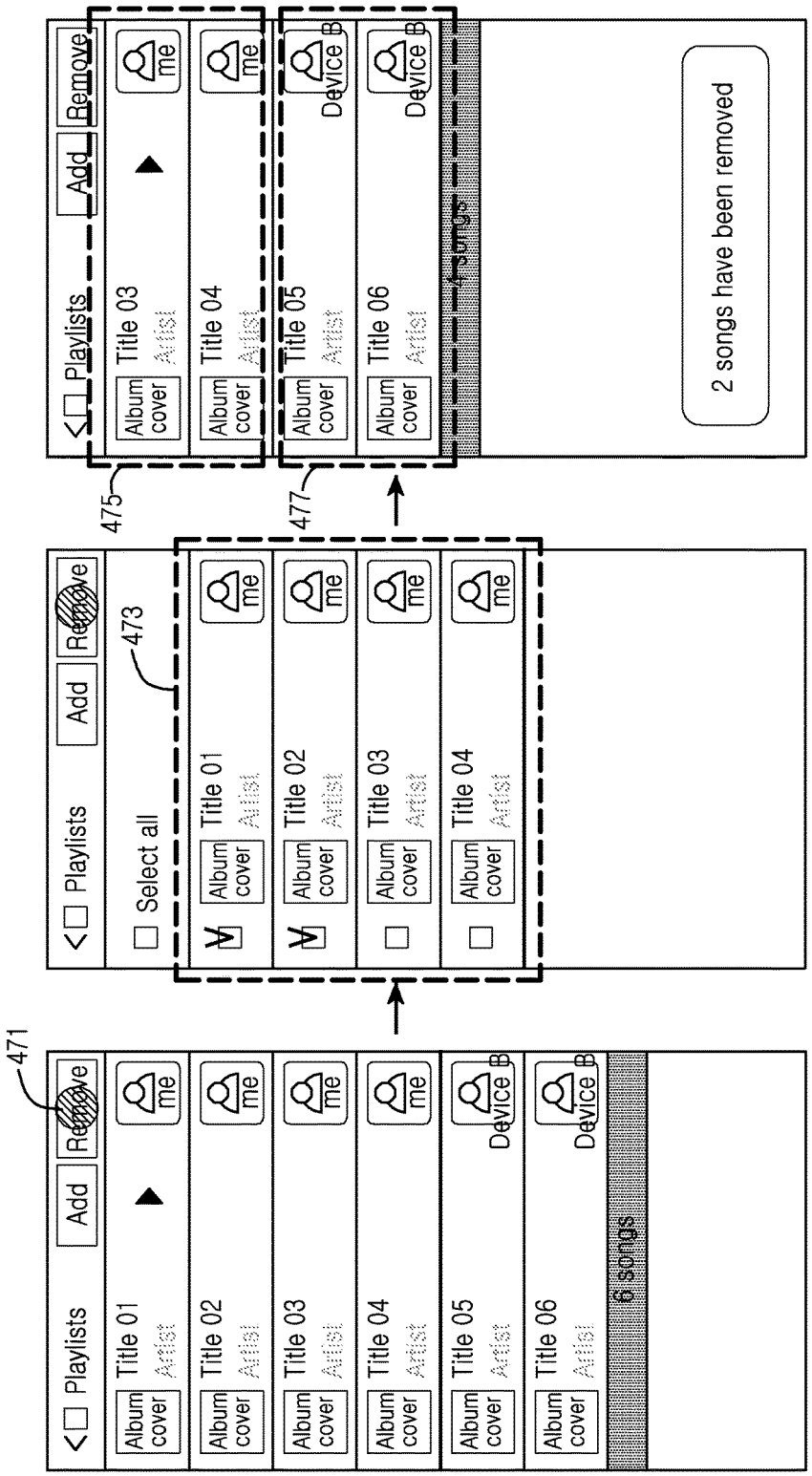
FIG. 4D is a diagram illustrating an example of removing stored media contents from a media contents sharing list in an electronic device within a media contents sharing group according to various embodiments of the present disclosure.

FIG. 4D is a diagram illustrating an example of removing stored media contents from a media contents sharing list in an electronic device within a media contents sharing group according to various embodiments of the present disclosure.

Referring to FIG. 4D, if a "Remove" menu for removing sharing media contents is selected in operation 471 by a user in a state of displaying a media contents sharing list, the electronic device 100 can provide a user interface capable of removing its own media contents 473 among media contents included in the media contents sharing list. The electronic device 100 can remove its own retaining media contents among the media contents included in the media contents sharing list, but cannot remove media contents retained by other electronic device within a group. The electronic device 100 can remove media contents of which the removal is requested by the user and update the media contents sharing list. The updated media contents sharing list can include the remnant media contents 475 of which the removal is not requested by the user and media contents 477 of other electronic device having been originally included in the media contents sharing list.

The electronic device 100 can transmit the media contents sharing list updated through the media contents removal, to at least one other electronic device, and share the updated media contents sharing list with the at least one other electronic device. Additionally, the electronic device 100 can detect a user input for removing at least one media content that is currently retained by the electronic device 100 from the memory 130, and remove the corresponding media content. If the media contents removed from the memory 130 are included in the media contents sharing list, the electronic device 100 can automatically remove the media contents from the media contents sharing list, and can share the media contents sharing list from which the media contents are removed, with the at least one other electronic device.

Figure 5A:
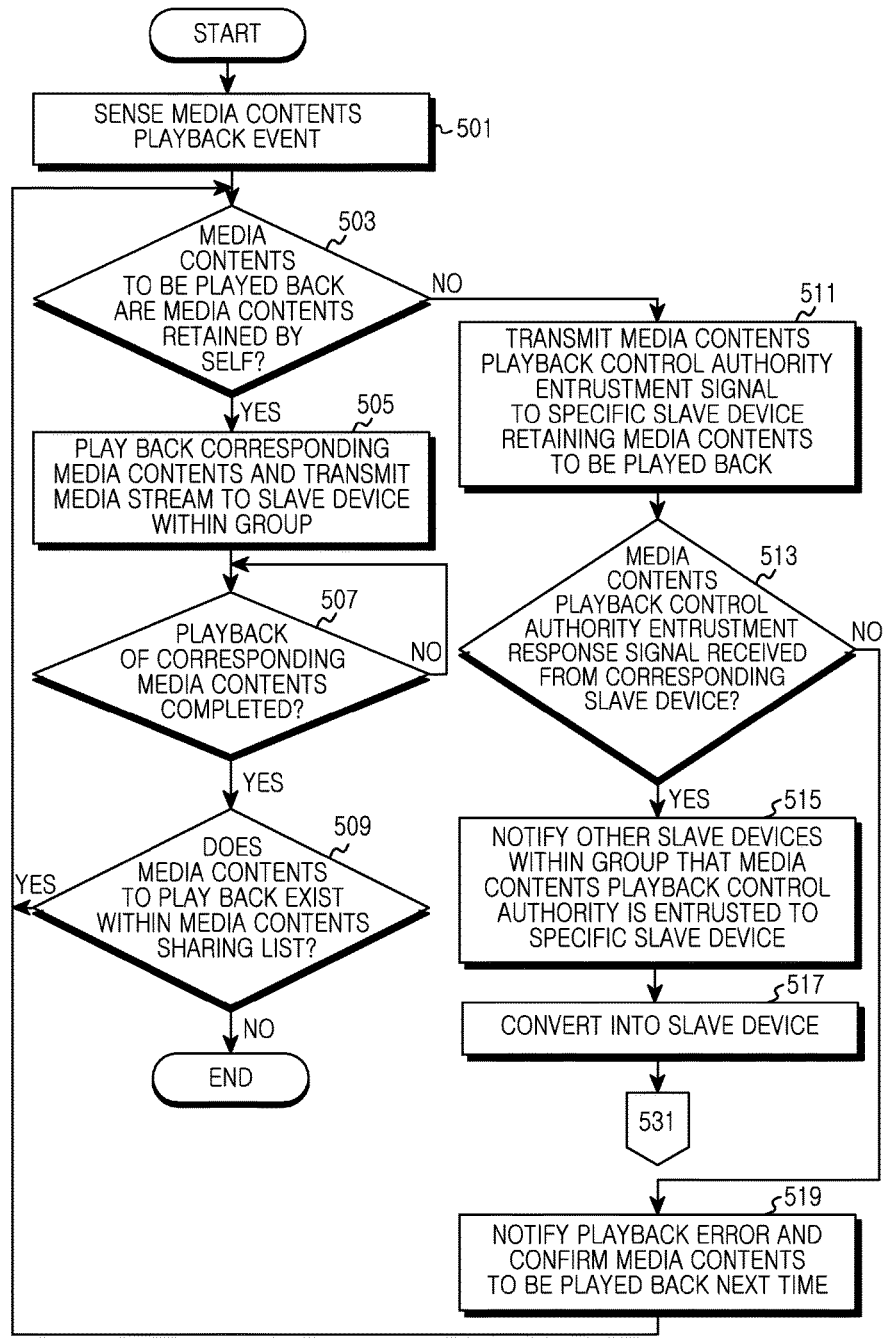
FIG. 5A is a flowchart illustrating a procedure of media contents playback in a master device within a media contents sharing group according to various embodiments of the present disclosure.

FIG. 5A is a flowchart illustrating a procedure of media contents playback in a master device within a media contents sharing group according to various embodiments of the present disclosure.

Referring to FIG. 5A, in operation 501, the master device detects a media contents playback event. In operation 503, the master device determines if media contents to be played back are its own retaining media contents. Based on a currently selected (or set) playback control method, the master device can decide media contents to play back at current timing. Based on electronic device identification information of media contents to play back at current timing within a media contents sharing list, the master device can confirm an electronic device retaining the corresponding media contents.

If the media contents to be played back are its own retaining media contents, in operation 505, the master device can play back the corresponding media contents and realtime transmit a media stream for the corresponding media contents to a slave device within a group. In operation 507, the master device determines if the playback of the corresponding media contents is completed.

If the playback of the corresponding media contents is completed, in operation 509, the master device determines if media contents to play back exist within the media contents sharing list. For example, the master device determines if the media contents to play back remain within the media contents sharing list. For example, if media contents included in the media contents sharing list are all played back by one time in a state where one-time playback is selected as a playback method, or if the playback-completed media contents of operation 509 are media contents of the last order included in the media contents sharing list, the master device can decide that the media contents to play back do not exist within the media contents sharing list.

For another example, when it is a state where repetition playback is selected as the playback method, the master device can decide that the media contents to play back exist, regardless of the order in which the playback-completed media contents are included in the media contents sharing list. If the media contents to playback do not exist within the media contents sharing list, the master device terminates the procedure of media contents playback according to the embodiment of the present disclosure. On the other hand, if the media contents to play back exist within the media contents sharing list, the master device returns to operation 503 and again performs the subsequent operations.

In any embodiment, if it is determined that the media contents to play back are not its own retaining media contents as the determination result of operation 503, in operation 511, the master device transmits a signal entrusting a media contents playback control authority, to a specific slave device retaining the corresponding media contents to play back. The signal entrusting the media contents playback control authority can include an instruction (or command information) of conversion into the master device, identification information of electronic devices to operate as slave devices among electronic devices within a group, and information of media contents to play back.

Additionally, the signal entrusting the media contents playback control authority can include information representing a currently selected (or set) playback control method. This is to enable an electronic device entrusted with the media contents playback control authority to operate as the master device and play back corresponding media contents, and decide media contents to play back next time after the playback of the corresponding media contents is completed. Additionally, when the playback control method included in the signal entrusting the playback control authority is random playback, the signal entrusting the playback control authority can additionally include information about a random playback technique (or algorithm).

In operation 513, the master device can determine whether a response signal to the media contents playback control authority entrustment is received from the slave device. If the response signal to the media contents playback control authority entrustment is not received from the slave device, the master device determines that a problem takes place in communication with the corresponding slave device or it is a situation where the corresponding slave device cannot play back the corresponding media contents. In operation 519, the master device notifies the occurrence of a playback error of the corresponding media contents and confirms media contents to be played back next time. Also, the master device returns to operation 503 and again performs the subsequent operations On the other hand, if the response signal to the media contents playback control authority entrustment is received from the slave device, in operation 515, the master device transmits a signal notifying that the media contents playback control authority is entrusted to a specific slave device, to other slave devices within the group. The signal notifying that the media contents playback control authority is entrusted to the specific slave device can include identification information of an electronic device to be converted into the master device and information of media contents to be played back. Also, the master device can convert into the slave device at operation 517 and then go to operation 531 of FIG. 5B below.

Figure 5B:
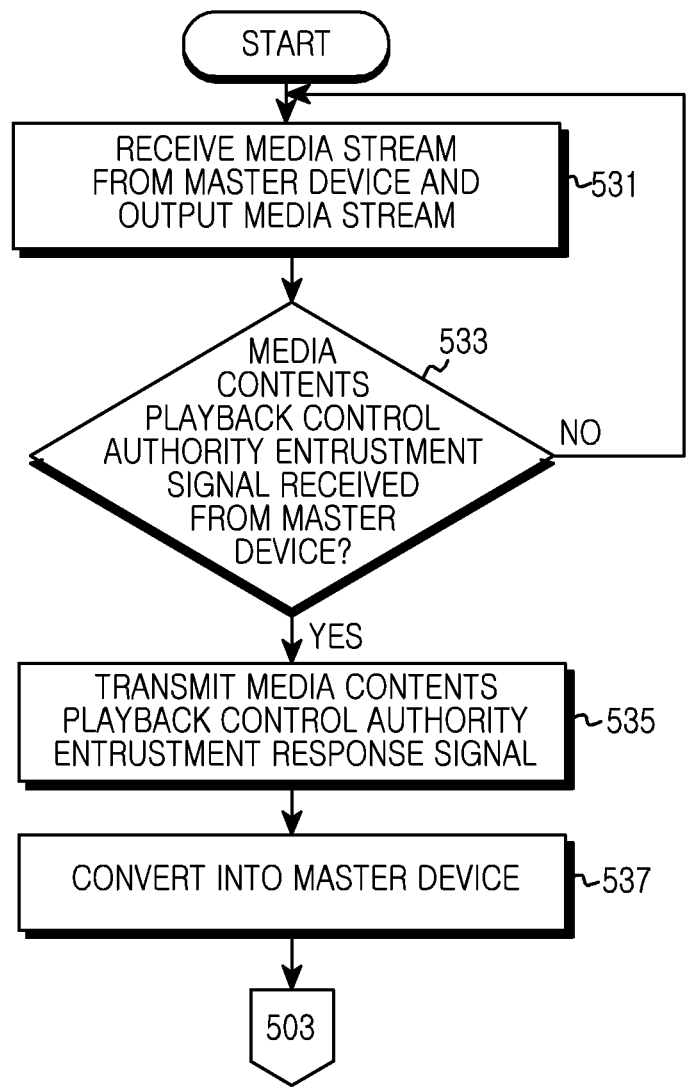
FIG. 5B is a flowchart illustrating a procedure of media contents playback in a slave device within a media contents sharing group according to various embodiments of the present disclosure.

FIG. 5B is a flowchart illustrating a procedure of media contents playback in a slave device within a media contents sharing group according to various embodiments of the present disclosure.

Referring to FIG. 5B, in operation 531, the slave device receives a media stream from a master device and outputs the received media stream. The media stream can include an audio stream and a video stream. The slave device can output the audio stream through a speaker, and output the video stream through a display device. Here, the speaker and the display device each can be a device included in the slave device, or can be a separate device provided outside the slave device. For example, the speaker can be an earphone, a headset, or a speaker device wired or wireless connected to the slave device, but is not limited thereto, and the display device can be a projector or a TV wired or wireless connected to the slave device, but is not limited thereto.

In operation 533, the slave device determines if a media contents playback control authority entrustment signal is received from the master device. The slave device can confirm identification information of other slave devices within a group from the media contents playback control authority entrustment signal, and confirm information of media contents to play back. In operation 535, the slave device can transmit a response signal to the master device in response to the media contents playback control authority entrustment signal. In operation 537, the slave device can convert into the master device and then go to operation 503 of FIG. 5A above.

Figure 5C:
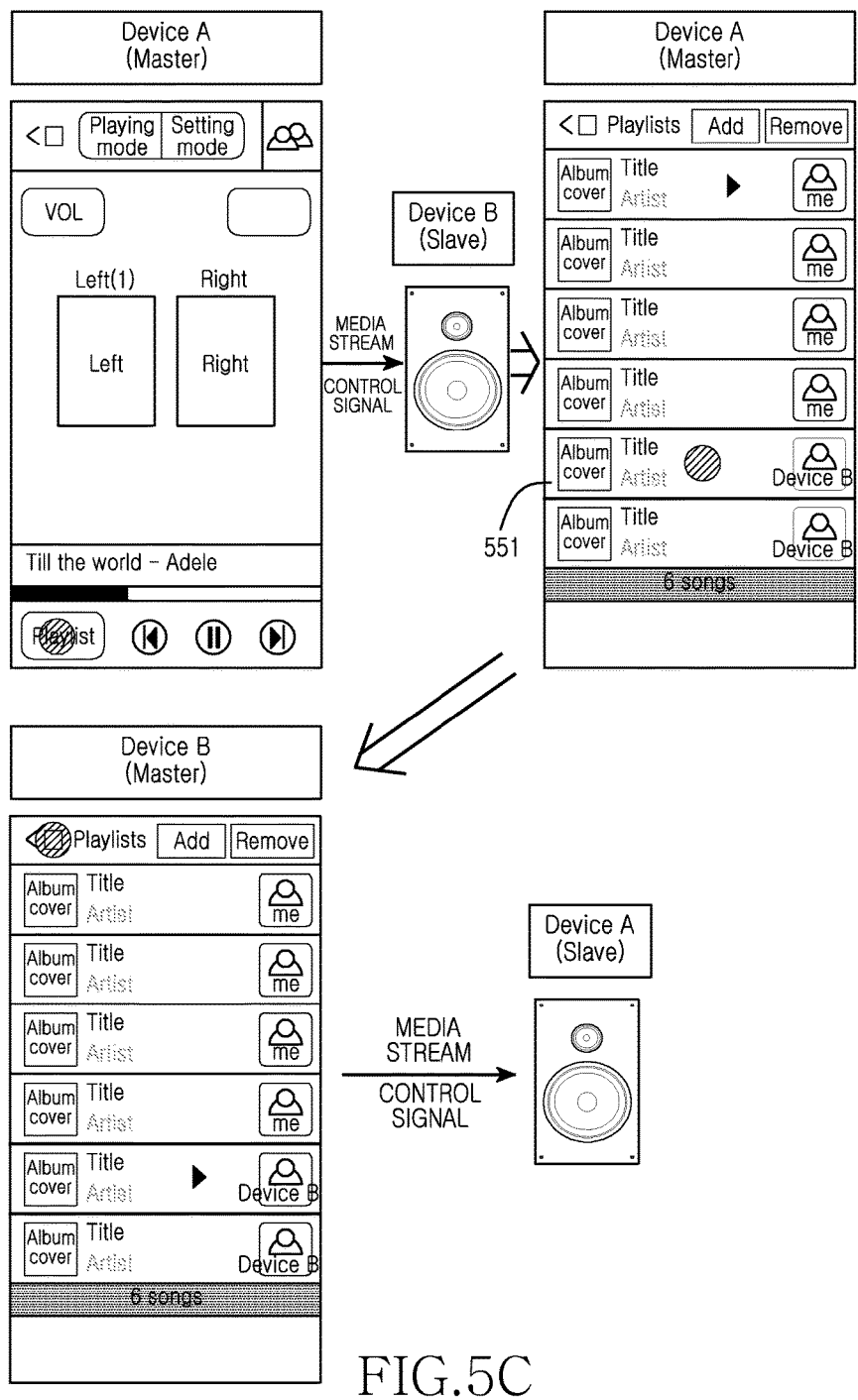
FIG. 5C is a diagram illustrating an example of entrusting a media contents playback control authority to other electronic device storing media contents to be played back in a specific electronic device in accordance to various embodiments of the present disclosure.

FIG. 5C is a diagram illustrating an example of entrusting a media contents playback control authority to other electronic device storing media contents to be played back in a specific electronic device in accordance to various embodiments of the present disclosure.

Referring to FIG. 5C, a description is made assuming that a device A operates as a master device and a device B operates as a slave device. At this time, the device A plays back specific media contents while transmitting a media stream to the device B, and the device B real-time outputs the media stream received from the device A. The device A operates as the master device having a media contents playback control authority and therefore, can transmit to the device B a control signal (e.g., a signal for controlling at least one of volume adjustment, playback speed adjustment, playback pause, and playback start) for controlling the playback of media contents of the device B.

The device A can receive a media contents sharing list display request from a user during playback of specific media contents, and display a media contents sharing list. The device A can receive a request for playback of media contents 551 retained by the device B from the user during the playback of the specific media contents or after completion of the playback of the specific media contents.

The device A receiving the request for the playback of the media contents 551 retained by the device B can entrust the media contents playback control authority to the device B. Also, the device B entrusted with the media contents playback control authority can convert into the master device and play back the corresponding media contents 551 while transmitting a media stream to the device A, and the device A can convert into the slave device and real-time output the media stream received from the device B. At this time, the device B can transmit to the device A a control signal (e.g., a signal for controlling at least one of volume adjustment, playback speed adjustment, playback pause, and playback start) for controlling the playback of media contents of the device A.

Referring to FIGS. 5A to 5C described above, the description has been made for a case in which an electronic device retaining media contents to play back among electronic devices within a group acquires a media contents playback control authority and operates as a master device, and the remnant electronic devices operate as slave devices. But, it would be also possible that, in accordance to a design method, the electronic device retaining the media contents to play back acquires only a media contents playback and transmission authority, and an electronic device operating as the first master device keeps having other control authority over media contents playback.

Figure 5D:
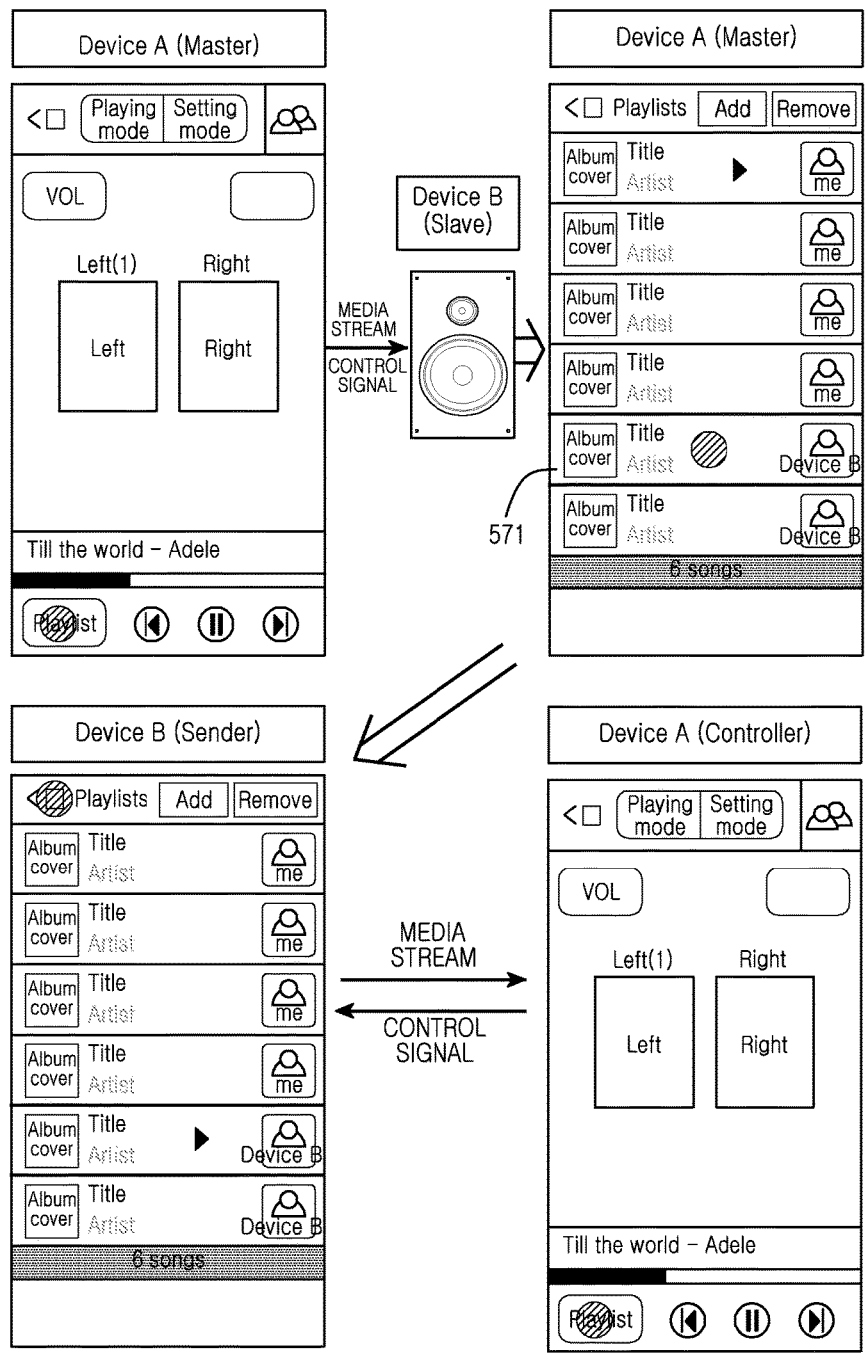
FIG. 5D is a diagram illustrating an example of entrusting a media contents playback and transmission authority to another electronic device storing media contents to be played back in a specific electronic device in accordance to various embodiments of the present disclosure.

FIG. 5D is a diagram illustrating an example of entrusting a media contents playback and transmission authority to another electronic device storing media contents to be played back in a specific electronic device in accordance to various embodiments of the present disclosure.

Referring to FIG. 5D, a description is made assuming that a device A operates as a master device and a device B operates as a slave device. At this time, the device A plays back specific media contents while transmitting a media stream to the device B, and the device B can real-time output the media stream received from the device A. The device A operates as the master device having a media contents playback control authority and therefore, can transmit to the device B a control signal (e.g., a signal for controlling at least one of volume adjustment, playback speed adjustment, playback pause, and playback start) for controlling the playback of media contents of the device B.

The device A can receive a media contents sharing list display request from a user during playback of specific media contents, and display a media contents sharing list. The device A can receive a request for playback of media contents 571 retained by the device B from the user during the playback of the specific media contents or after completion of the playback of the specific media contents. The device A receiving the request for the playback of the media contents 551 retained by the device B can entrust a media contents playback and transmission authority among the media contents playback control authority to the device B.

Figure 6A:
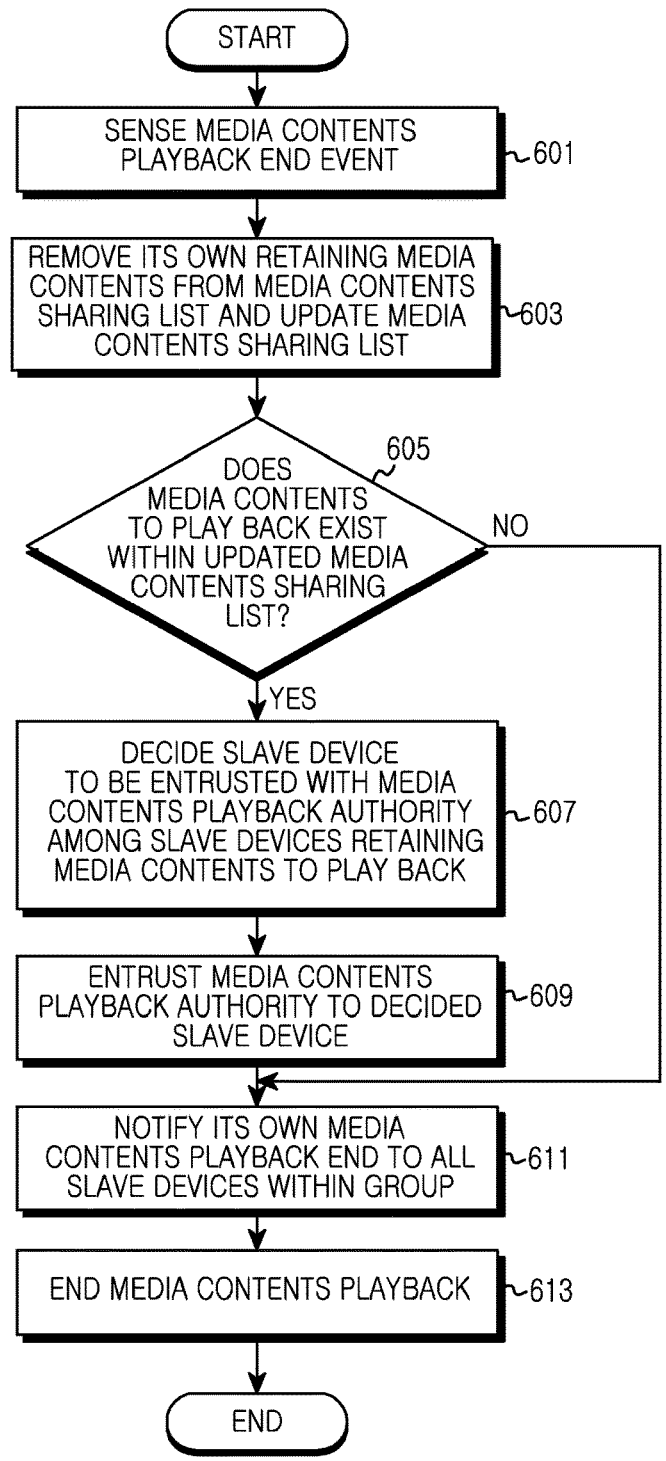
FIG. 6A is a flowchart illustrating a procedure of ending a media contents sharing function in a master device within a media contents sharing group according to various embodiments of the present disclosure.

Also, the device B entrusted with the media contents playback and transmission authority can convert into a transmission device and play back the corresponding media contents 571 while transmitting a media stream to the device A. The device B operating as the transmission device cannot control the playback of media contents of the device A. The device A entrusts only the media contents playback and transmission authority to the device B and therefore, can convert into a control device and perform a function for controlling media contents playback. For example, the device A can receive a media stream from the device B and output the received media stream, while transmitting a control signal (e.g., a signal for controlling at least one of volume adjustment, playback speed adjustment, playback pause, playback start, and the like) for controlling the playback of media contents of the device B to the device B. In accordance to another embodiment, it would be also possible to more subdivide the media contents playback control authority, and entrust only an authority set by a user or designer among electronic devices FIG. 6A is a flowchart illustrating a procedure of ending a media contents sharing function in a master device within a media contents sharing group according to various embodiments of the present disclosure.

Referring to FIG. 6, in operation 601, the master device detects a media contents playback end event. In operation 603, the master device detecting the media contents playback end event removes its own retaining media contents from a media contents sharing list to update the media contents sharing list.

In operation 605, the master device determines if media contents to play back exist within the updated media contents sharing list. For example, the master device determines if the media contents to play back remain within the media contents sharing list. For example, if all media contents included in the media contents sharing list are played back by one time, or if media contents of which the playback is completed in operation 605 are media contents of the last order included in the media contents sharing list, the master device can decide that the media contents to play back do not exist within the media contents sharing list.

If the media contents to play back do not exist within the media contents sharing list, the mater device jumps to operation 611 and notifies its own media contents playback end to all slave devices within a group. In operation 613, the master device ends a sharing media contents playback function. On the other hand, if the media contents to play back exist within the media contents sharing list, in operation 607, the master device decides a slave device to be entrusted with a media contents playback authority among the slave devices retaining the media contents to play back. The master device can decide a slave device retaining media contents to play back at next timing, as the device to be entrusted with the media contents playback authority. Here, the media contents to playback at next timing can represent media contents of the fastest playback order among media contents to play back from current timing.

The master device proceeds to operation 609 and entrusts the media contents playback authority to the decided slave device, and proceeds to operation 611 and notifies its own media contents playback end to all the slave devices within the group. In operation 613, the master device ends a sharing media contents playback function. The electronic device terminates the procedure of ending the media contents sharing function according to the embodiment of the present disclosure.

Figure 6B:
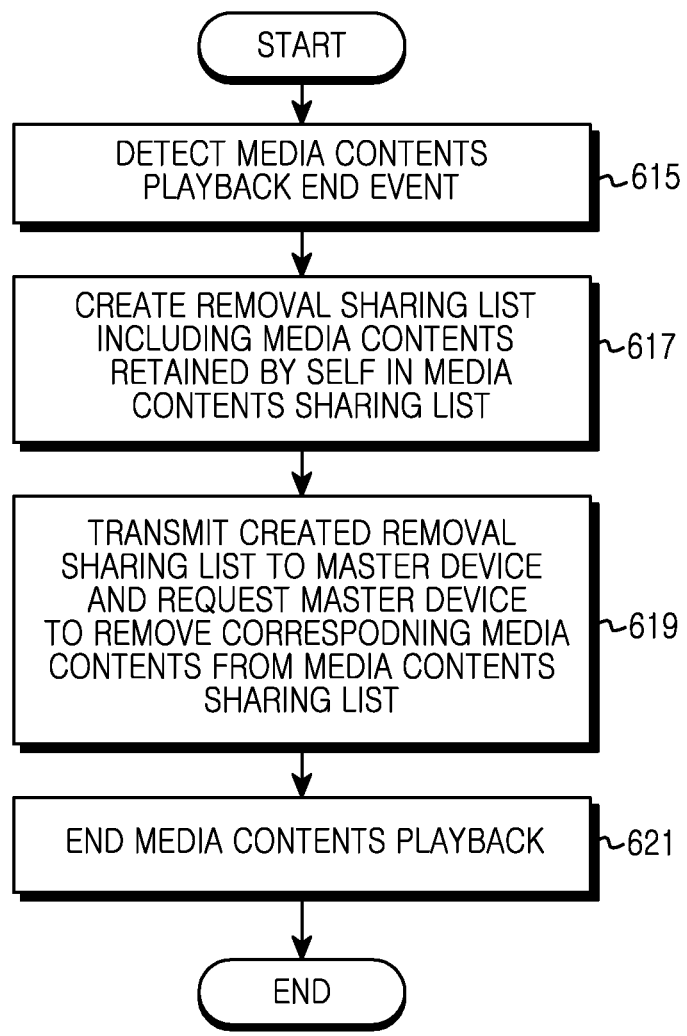
FIG. 6B is a flowchart illustrating a procedure of ending a media contents sharing function in a slave device within a media contents sharing group according to various embodiments of the present disclosure.

FIG. 6B is a flowchart illustrating a procedure of ending a media contents sharing function in a slave device within a media contents sharing group according to various embodiments of the present disclosure.

Referring to FIG. 6B, in operation 615, the slave device detects a media contents playback end event. In operation 617, the slave device detecting the media contents playback end event creates a removal sharing list including its own retaining media contents, in a media contents sharing list.

In operation 619, the slave device transmits the created removal sharing list to the master device and requests the master device to remove its own retaining media contents from the media contents sharing list. At this time, the slave device can notify its own media contents sharing function end to the master device. In operation 621, the slave device ends the media contents playback function, and terminates the procedure of ending the media contents sharing function according to the embodiment of the present disclosure.

Referring to FIGS. 6A and 6B described above, the master device can be a group owner for a group formed for a media contents sharing service or not the group owner. In accordance to an embodiment, if the media contents playback function of the master device being the group owner is ended, one electronic device among the remnant electronic devices within the group operates as the group owner and maintains the media contents sharing service group, and dynamically allocates a media contents playback authority among the remnant electronic devices and dynamically changes the master device, whereby the media contents sharing function is not ended and the media contents retained by the remnant electronic devices can be continuously played back and shared.

In accordance to another embodiment, if the media contents playback function of the master device not being the group owner is ended, the present disclosure maintains a media contents sharing service group with the remnant electronic devices excepting the electronic device ending the media contents playback function, and dynamically allocates a media contents playback authority among the remnant electronic devices and dynamically changes the master device, whereby the media contents sharing function is not ended and the media contents retained by the remnant electronic devices can be continuously played back and shared.

In accordance to another embodiment, when the group for the media contents sharing service is formed without the group owner based on a P2P network or an Ad hoc network, if the media contents playback function of the master device is ended, the present disclosure dynamically allocates a media contents playback authority among the remnant electronic devices and dynamically changes the master device, whereby the media contents sharing function is not ended and the media contents retained by the remnant electronic devices can be continuously played back and shared.

According to various embodiments of the present disclosure, by dynamically entrust a media contents playback control authority among a plurality of electronic devices based on a media contents sharing list including media contents retained by each of the plurality of electronic devices within a group, an electronic device retaining media contents to play back can play back the corresponding media contents and thus, media contents can be shared without interruption.

According to various embodiment of the present disclosure, by dynamically allocating a media contents playback authority among a plurality of electronic devices, media contents sharing functions of the remnant electronic devices within a group are not ended and media contents retained by the remnant electronic devices can be continuously played back and shared.

Various embodiments of the disclosure and all function operations described in the present specification can be implemented by computer software including structures disclosed in the present specification and equivalent structures thereof, firmware, hardware or a combination of one or more of them. Also, the embodiments of the disclosure described in the present specification can be executed by one or more computer program products, i.e., data processing devices, or can be executed by one or more modules of computer program instructions encoded on a computer-readable medium for controlling operations of these devices.

The computer-readable medium can be a machine-readable storage medium, a machine-readable storage substrate, a memory device, a construction of substance affecting a machine-readable radio wave stream, or a combination of one or more of them. The term of data processing device can include, for example, all instruments, devices and machines for processing data including a programmable processor or computer or a multi-processor or computer. The instrument can include a code added to hardware and generating an execution environment for a corresponding computer program, for example, a code constructing a processor firmware, a protocol stack, a database management system, an operating system, or a combination of one or more of them.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of operating a first electronic device, the method comprising:
   acquiring, by the first electronic device, a media contents sharing list which comprises information of a first media content and information of a second media content, the first media content being retained by the first electronic device and the second media content being retained by a second electronic device communicating with the first electronic device;
   in response to detecting a request for playing the first media content within the media contents sharing list, transmitting, by the first electronic device, the first media content to the second electronic device; and
   in response to detecting a request for playing the second media content listed in the media contents sharing list transmitting, by the first electronic device, to the second electronic device, a signal for entrusting authority to control a playback of the second media content,
   after transmitting the signal to the second electronic device, receiving, by the first electronic device, the second media content transmitted from the second electronic device, and
   outputting, by the first electronic device, the received second media content.

2. The method of claim 1, further comprising:
  detecting an input for removing media contents from the media contents sharing list; and
  based on the input, removing the removal-requested media contents from the media contents sharing list.

3. The method of claim 2, wherein the removing of the removal-requested media contents comprises:
  based on the input, displaying the first media content retained by the first electronic device among the media contents comprised in the media contents sharing list; and
  detecting a request for removal of the displayed first media content.

4. The method of claim 3, wherein the displaying of the first media content comprises displaying a graphic effect representing the impossibility of removal of the second media content retained by the second electronic device communicating with the first electronic device among the media contents comprised in the media contents sharing list.

5. The method of claim 2, wherein the removing of the removal-requested media contents comprises sharing the media contents sharing list from which the media contents have been removed, with the second electronic device communicating with the first electronic device.

6. The method of claim 1, wherein the electronic device and the external electronic device is included in same group for sharing media contents.

7. The method of claim 6,
  wherein the electronic device has operated as master device in the group operates as slave device after transmitting the signal for entrusting authority, and the external electronic device has operated as slave device in the group operates as master device after transmitting the signal for entrusting authority, and
  wherein the electronic device has operated as master device based on determination that user input for sharing media content in the electronic device precedes user input for sharing media content in the external electronic device.

8. The method of claim 7,
  wherein the electronic device which has operated as master device has displayed the media contents sharing list and user interface for controlling music playback, and
  wherein the electronic device which operates as slave device displays a graphic representing that the electronic device is outputting an audio stream received from master device.

9. The method of claim 6, wherein the electronic device operates a mobile AP for creating the group.

10. The method of claim 1, further comprising:
  detecting an input for adding media contents to the media contents sharing list; and
  based on the input, adding the addition-requested media contents to the media contents sharing list.

11. The method of claim 10, wherein the adding of the addition-requested media contents comprises:
  displaying at least one media content not comprised in the media contents sharing list among a media contents retained by the first electronic device; and
  detecting a request for addition of the displayed at least one media content.

12. The method of claim 11, further comprising sharing the media contents sharing list to which the media contents have been added, with the second electronic device communicating with the first electronic device.

13. The method of claim 1, wherein the transmitting of the signal for entrusting authority to control the playback of the second media content comprises transmitting a signal for switching, by the first electronic device, the authority from the first electronic device, to the second electronic device.

14. The method of claim 13, wherein the switching of the authority comprises sending, by the first electronic device, to the second electronic device at least one request among a volume adjustment request, a playback speed adjustment request, a sharing media contents addition request, or a sharing media contents removal request.

15. The method of claim 1, wherein the acquiring of the media contents sharing list comprises:
  receiving a list comprising information of the second media content retained by the second electronic device, from the second electronic device; and
  collecting the list and a list comprising information of the first media content retained by the first electronic device.

16. The method of claim 15, wherein the collecting of the list comprises, when media contents having same metadata in the media contents sharing list are comprised in different electronic devices, determining that the media contents having the same metadata are different media contents.

17. The method of claim 1, wherein the authority to control the playback of the second media content includes authority to perform at least one of media contents playback, media stream transmission, playback start, playback stop, pause, fast forward, rewind, seek, speaker selection, channel selection, selection of media contents to be played back, volume adjustment, playback speed adjustment, playback method selection, media contents sharing list editing, media contents sharing list alignment, or media contents sharing list transmission.

18. The method of claim 1, wherein the transmitting of the signal for entrusting the authority to control the playback of the second media content comprises transmitting a signal, which comprises at least one of information requesting conversion into a master device, identification information of the first electronic device to be operated as a slave device, or information of media contents to be played back, to the second electronic device.

19. The method of claim 1, wherein the transmitting of the signal comprises:
  wherein the authority to control the playback of the second media content comprises media contents playback and media stream transmission authority.

20. The method of claim 1, wherein the media contents sharing list comprises, for media contents, identification information of an electronic device retaining the corresponding media contents.

21. The method of claim 1, wherein the acquiring of the media contents sharing list comprises:
  determining if the authority has been entrusted to the second electronic device from the first electronic device; and
  based on the determination result, transmitting the media contents sharing list from the first electronic device to the second electronic device.

22. The method of claim 1, further comprising:
  in accordance to a user input, removing at least one media content comprised in the media contents sharing list from a memory;
  removing the at least one media content removed from the memory, from the media contents sharing list; and sharing the media contents sharing list from which the media contents have been removed, with the second electronic device communicating with the first electronic device.

23. An electronic device comprising:
a memory configured to store instructions therein;
an output interface configured to output media contents; and
at least one processor configured to control the output interface,
wherein upon execution of the instructions, the at least one processor is further configured to:
  acquire a media contents sharing list comprising information of media contents retained by the electronic device and information of media contents retained by an external electronic device communicating with the electronic device,
  in response to detecting a request for playing first media content retained by the electronic device within the media contents sharing list, perform an operation of playing back the first media content while transmitting the first media content to the external electronic device, and
  in response to detecting a request for playing a second media content retained by the external electronic device listed in the media contents sharing list:
    transmit, to the external electronic device, a signal for entrusting authority to control a playback of the second media content,
    after transmitting the signal to the external electronic device, receive the second media content transmitted from the external electronic device, and
    output the received second media content.

24. The device of claim 23, further comprising a communication interface configured to communicate with the external electronic device.

25. The device of claim 23, wherein the output interface comprises at least one of a display configured to display at least one of the media contents sharing list and video data by the media contents playback, or an audio output interface configured to output audio data by the media contents playback.

26. An electronic device comprising:
a memory configured to store instructions therein;
a display configured to display a media contents sharing list;
an input sensor configured to detect an input for removing media contents; and
at least one processor configured to control the display,
wherein upon execution of the instructions, the at least one processor is further configured to:
  display, by the display, the media contents sharing list comprising first media content retained by the electronic device and second media content retained by an external electronic device,
  receive a signal for entrusting authority to control a playback of the second media content,
  based on the receiving of the signal for entrusting authority, transmit the second media content to the external electronic device, the external electronic device outputting the second media content,
  exclude the second media content retained by the external electronic device communicating with the electronic device among the media contents comprised in the media contents sharing list based on the input detecting of the input sensor, and
  display the first media content retained by the electronic device,
wherein the input sensor detects a request for removal of the displayed first media content retained by the electronic device, and
wherein the at least one processor is further configured to remove the removal-requested media contents from the media contents sharing list.

* * * * *